(12) United States Patent
Tamura

(10) Patent No.: US 10,551,982 B2
(45) Date of Patent: Feb. 4, 2020

(54) INSTRUCTION RECEPTION APPARATUS, INFORMATION PROCESSING APPARATUS, SIGNAL PROCESSING METHOD, AND PROGRAM

(71) Applicant: FUJIFILM CORPORATION, Minato-ku, Tokyo (JP)

(72) Inventor: Kazunori Tamura, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/954,626

(22) Filed: Apr. 17, 2018

(65) Prior Publication Data

US 2018/0232082 A1 Aug. 16, 2018

Related U.S. Application Data

(63) Continuation of application No. PCT/JP2016/079370, filed on Oct. 3, 2016.

(30) Foreign Application Priority Data

Oct. 19, 2015 (JP) ................................ 2015-205807

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04105* (2013.01)

(58) Field of Classification Search
CPC ................... G06F 3/044; G06F 3/0416; G06F 2203/04105
(Continued)

(56) References Cited

U.S. PATENT DOCUMENTS

2006/0001655 A1* 1/2006 Tanabe .................... G06F 3/044
 345/176
2011/0050628 A1* 3/2011 Homma ................ G06F 3/0236
 345/174
(Continued)

FOREIGN PATENT DOCUMENTS

JP 2010-142062 A 6/2010
JP 2011-053973 A 3/2011
(Continued)

OTHER PUBLICATIONS

English language translation of the following: Office action dated Jun. 12, 2018 from the JPO in a Japanese patent application No. 2017-546486 corresponding to the instant patent application.
(Continued)

*Primary Examiner* — Jennifer Mehmood
*Assistant Examiner* — Ngan T Pham Lu
(74) *Attorney, Agent, or Firm* — Solaris Intellectual Property Group, PLLC

(57) ABSTRACT

An instruction reception apparatus includes: a charge accumulation unit that includes a first capacitor in which a pair of electrodes are disposed to face each other under an instruction reception surface, a resistor that is disposed to correspond to the pair of electrodes under the instruction reception surface and has a resistance value between the pair of electrodes that is changed as the instruction reception surface is pressed, and a second capacitor that is connected to the first capacitor; a measurement unit that measures a physical quantity corresponding to the amount of electric charges of the second capacitor; and an output unit that selectively outputs a contact state signal indicating a contact state, a non-contact state signal indicating a non-contact state, and a pressing state signal indicating a pressing state
(Continued)

where the indicator presses against the instruction reception surface, in accordance with the physical quantity measured.

11 Claims, 25 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2011/0057903 | A1 | 3/2011 | Yamano et al. |
| 2011/0234508 | A1* | 9/2011 | Oda .................... G06F 3/044 345/173 |
| 2011/0267304 | A1 | 11/2011 | Simmons et al. |
| 2016/0216835 | A1 | 7/2016 | Takaba et al. |

FOREIGN PATENT DOCUMENTS

| | | |
|---|---|---|
| JP | 2011-059821 A | 3/2011 |
| JP | 2011-209785 A | 10/2011 |
| JP | 2011-238240 A | 11/2011 |
| JP | 2014-110010 A | 6/2014 |
| JP | 2014-150612 A | 8/2014 |
| WO | 2015/041256 A1 | 3/2015 |

OTHER PUBLICATIONS

International Search Report issued in International Application No. PCT/JP2016/079370 dated Nov. 1, 2016.
Written Opinion of the ISA issued in International Application No. PCT/JP2016/079370 dated Nov. 1, 2016.
Written Opinion of the International Preliminary Examining Authority issued in International Application No. PCT/JP2016/079370 dated Mar. 21, 2017.
International Preliminary Report on Patentability issued in International Application No. PCT/JP2016/079370 dated Jul. 25, 2017.

* cited by examiner

FIG. 3
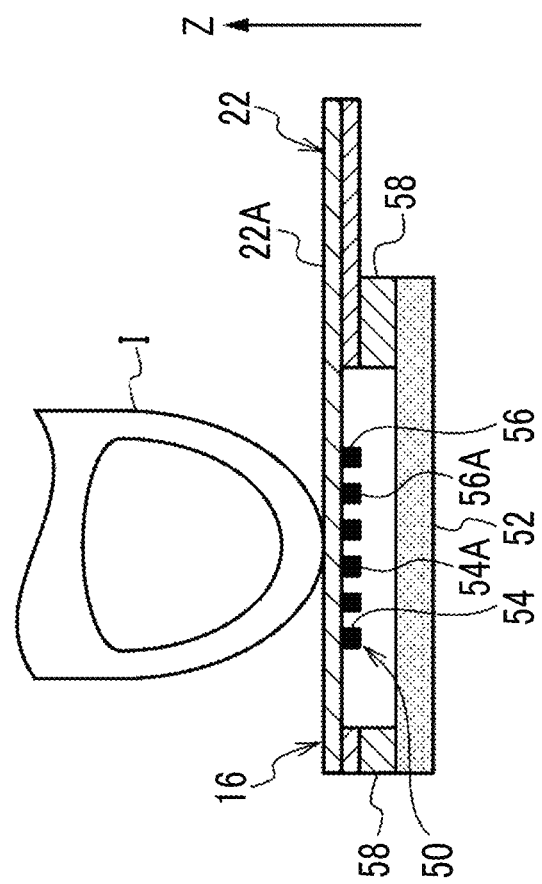
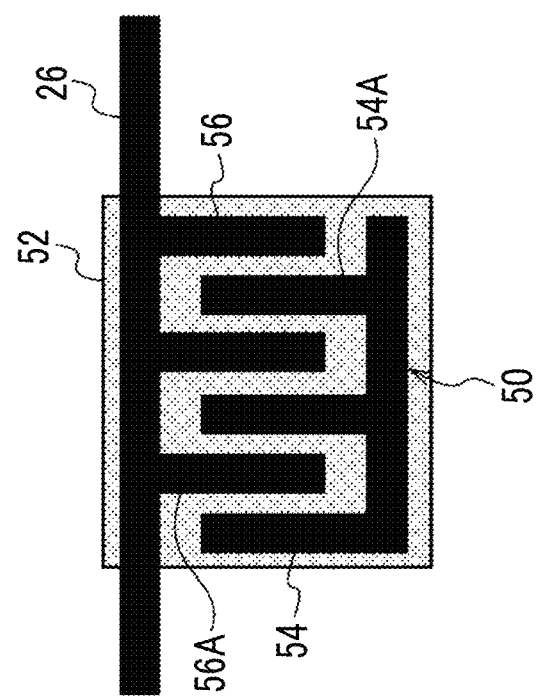

FIG. 4
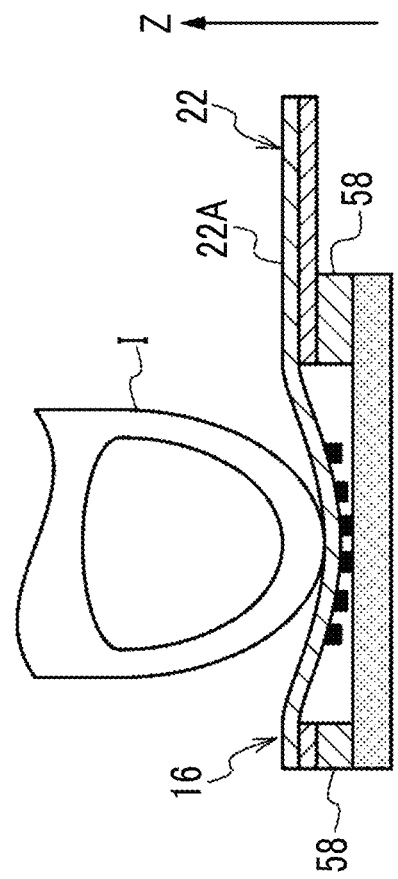
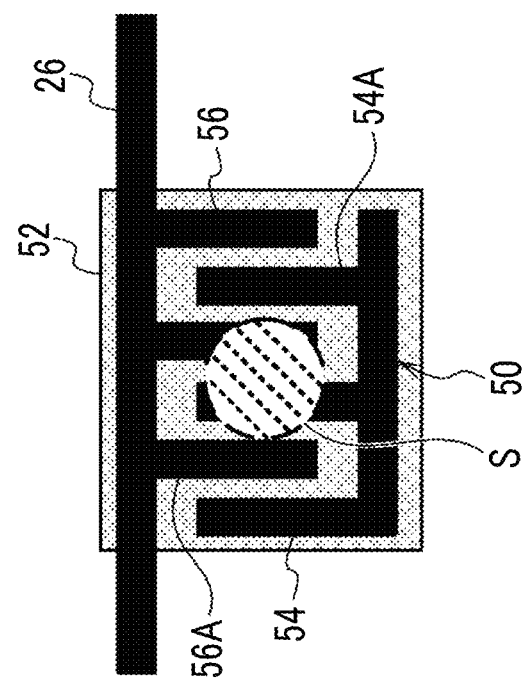

FIG. 5
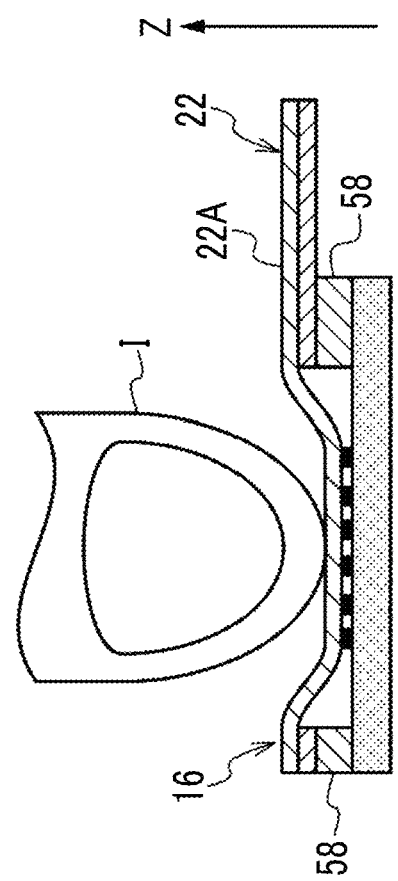
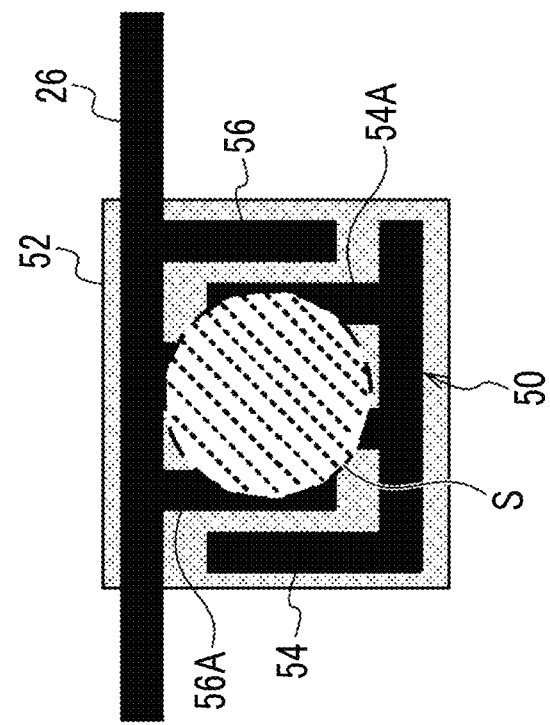

INSTRUCTION RECEPTION APPARATUS, INFORMATION PROCESSING APPARATUS, SIGNAL PROCESSING METHOD, AND PROGRAM

CROSS-REFERENCE TO RELATED APPLICATIONS

This application is a continuation application of International Application No. PCT/JP2016/079370, filed Oct. 3, 2016, the disclosure of which is incorporated herein by reference in its entirety. Further, this application claims priority from Japanese Patent Application No. 2015-205807, filed Oct. 19, 2015, the disclosure of which is incorporated herein by reference in its entirety.

BACKGROUND

1. Technical Field

The technique of the present disclosure relates to an instruction reception apparatus, an information processing apparatus, a signal processing method, and a program.

2. Related Art

JP2011-209785A discloses an indicator detection apparatus that includes a detection sensor, a signal supply circuit, and a signal detection circuit. The indicator detection apparatus disclosed in JP2011-209785A discriminates between a contact state, a non-contact state, and a pressing state with respect to an instruction reception surface of an indicator.

In this specification, a contact state refers to a state where an indicator is in contact with an instruction reception surface, a non-contact state refers to a state where the indicator is not in contact with the instruction reception surface, and a pressing state refers to a state where the indicator presses against the instruction reception surface. Further, in this specification, the indicator refers to an object capable of being in contact with or pressing against the instruction reception surface, such as a finger or a stylus pen. Further, in this specification, the instruction reception surface refers to a surface that receives an instruction of a user through contact or pressing in a so-called touch panel, for example.

In the indicator detection apparatus disclosed in JP2011-209785A, the detection sensor includes a plurality of first conductors, a plurality of second conductors, and a pressure sensitive material. The plurality of first conductors are disposed in a first direction, and the plurality of second conductors are disposed in a second direction intersecting the first direction. The pressure sensitive material is disposed between the plurality of first conductors and the plurality of second conductors, and has a predetermined resistance characteristic.

Further, in the indicator detection apparatus disclosed in JP2011-209785A, the signal supply circuit supplies a predetermined signal to the plurality of first conductors, and the signal detection circuit detects a signal from the plurality of second conductors.

Further, in the indicator detection apparatus disclosed in JP2011-209785A, the detection sensor supplies, in a case where an indicator is disposed in the vicinity of the detection sensor, a signal based on a change in an electrostatic capacitance between the plurality of first conductors and the plurality of second conductors to the signal detection circuit.

In addition, in the indicator detection apparatus disclosed in JP2011-209785A, the detection sensor supplies, in a case where a pressure applied in a case where an indicator is in contact with the detection sensor is smaller than a predetermined pressure, a signal based on a change in an electrostatic capacitance between the plurality of first conductors and the plurality of second conductors to the signal detection circuit.

Furthermore, in the indicator detection apparatus disclosed in JP2011-209785A, the detection sensor supplies, in a case where an indicator applies a pressure that exceeds a predetermined pressure to the detection sensor, a signal based on a change in a resistance characteristic of the pressure sensitive material due to application of a pressure from the indicator to the pressure sensitive material to the signal detection circuit.

That is, the indicator detection apparatus disclosed in JP2011-209785A discriminates between a contact state, a non-contact state, and a pressing state of an indicator with respect to an instruction reception surface by selectively using a so-called electrostatic capacitance system and a resistive membrane system.

SUMMARY

However, in the technique disclosed in JP2011-209785A, in order to discriminate between a contact state, a non-contact state, and a pressing state of an indicator with respect to an instruction reception surface, two physical quantities of a variation of an electrostatic capacitance and a variation of a resistance characteristic need to be measured. That is, in the technique disclosed in JP2011-209785A, the physical quantities need to be measured by selectively using the electrostatic capacitance system and the resistive membrane system.

One embodiment of the invention provides an instruction reception apparatus, an information processing apparatus, a signal processing method, and a program capable of easily discriminating between a contact state, a non-contact state, and a pressing state of an indicator with respect to an instruction reception surface, compared with a case where physical quantities are measured by selectively using an electrostatic capacitance system and a resistive membrane system.

An instruction reception apparatus according to a first aspect of the invention comprises: an instruction reception surface that receives an instruction; a charge accumulation unit that includes a first capacitor in which a pair of electrodes are disposed to face each other under the instruction reception surface, a resistor that is disposed to correspond to the pair of electrodes under the instruction reception surface and has a resistance value between the pair of electrodes that is changed as the instruction reception surface is pressed, and a second capacitor that is connected to the first capacitor; a measurement unit that measures a physical quantity corresponding to the amount of electric charges of the second capacitor; and an output unit that selectively outputs a contact state signal indicating a contact state where an indicator is in contact with the instruction reception surface, a non-contact state signal indicating a non-contact state where the indicator is not in contact with the instruction reception surface, and a pressing state signal indicating a pressing state where the indicator presses against the instruction reception surface, in accordance with the physical quantity measured by the measurement unit.

Accordingly, according to the instruction reception apparatus according to the first aspect of the invention, compared with a case where a physical quantity is measured by selectively using an electrostatic capacitance system and a resistive membrane system, it is possible to easily discriminate between a contact state, a non-contact state, and a pressing state of an indicator with respect to an instruction reception surface.

In the instruction reception apparatus according to the first aspect of the invention, an instruction reception apparatus according to a second aspect of the invention is configured so that the output unit outputs the contact state signal in a case where an in-contact physical quantity that is set in advance as a physical quantity corresponding to the amount of electric charges in the contact state is measured by the measurement unit, outputs the non-contact state signal in a case where an in-non-contact physical quantity that is set in advance as a physical quantity corresponding to the amount of electric charges in the non-contact state is measured by the measurement unit, and outputs the pressing state signal in a case where an in-pressing physical quantity that is set in advance as a physical quantity corresponding to the amount of electric charges in the pressing state is measured by the measurement unit.

Accordingly, according to the instruction reception apparatus according to the second aspect of the invention, compared with a case where both of an electrostatic capacitance and a resistance value of a resistive membrane are measured, it is possible to promptly discriminate between a contact state, a non-contact state, and a pressing state of an indicator with respect to an instruction reception surface.

In the instruction reception apparatus according to the second aspect of the invention, an instruction reception apparatus according to a third aspect of the invention is configured so that the in-non-contact physical quantity is larger than the in-contact physical quantity, and the in-pressing physical quantity is larger than the in-non-contact physical quantity.

Accordingly, according to the instruction reception apparatus according to the third aspect of the invention, compared with a case where there is no difference between an in-non-contact physical quantity, an in-contact physical quantity, and an in-pressing physical quantity, it is possible to discriminate between a contact state, a non-contact state, and a pressing state of an indicator with respect to an instruction reception surface with high accuracy.

In the instruction reception apparatus according to the third aspect of the invention, an instruction reception apparatus according to a fourth aspect of the invention is configured so that in a case where the physical quantity that exceeds the in-contact physical quantity and is smaller than the in-pressing physical quantity is measured by the measurement unit, the output unit selectively outputs the contact state signal and the non-contact state signal in accordance with a change in the physical quantity measured by the measurement unit.

Accordingly, according to the instruction reception apparatus according to the fourth aspect of the invention, even in a case where an in-non-contact physical quantity is larger than an in-contact physical quantity and an in-pressing physical quantity is larger than the in-non-contact physical quantity, it is possible to discriminate between a contact state and a non-contact state of an indicator with respect to an instruction reception surface.

In the instruction reception apparatus according to the fourth aspect of the invention, an instruction reception apparatus according to a fifth aspect of the invention is configured so that in a case where the in-non-contact physical quantity is measured by the measurement unit and the change in the physical quantity measured by the measurement unit represents a predetermined change, the output unit outputs the non-contact state signal.

Accordingly, according to the instruction reception apparatus according to the fifth aspect of the invention, even in a case where an in-non-contact physical quantity is larger than an in-contact physical quantity and an in-pressing physical quantity is larger than the in-non-contact physical quantity, it is possible to prevent a state that is not a real contact state from being mistakenly discriminated as a contact state.

In the instruction reception apparatus according to any one of the third aspect to the fifth aspect of the invention, an instruction reception apparatus according to a sixth aspect of the invention is configured so that in a case where the contact state signal is previously output, and the physical quantity that is different from the in-non-contact physical quantity, exceeds the in-contact physical quantity, and is smaller than the in-pressing physical quantity is measured by the measurement unit, the output unit outputs the contact state signal.

Accordingly, according to the instruction reception apparatus according to the sixth aspect of the invention, it is possible to prevent a state that is not a real contact state from being mistakenly discriminated as a contact state.

In the instruction reception apparatus according to any one of the third aspect to the sixth aspect of the invention, an instruction reception apparatus according to a seventh aspect of the invention is configured so that the first capacitor is formed for each set of coordinates provided to the instruction reception surface, and the output unit outputs the contact state signal in a case where the contact state signal is not previously output with respect to focused coordinates among the coordinates, in a case where the physical quantity that exceeds the in-non-contact physical quantity and is smaller than the in-pressing physical quantity is measured with respect to the focused coordinates by the measurement unit, and in a case where the physical quantity that exceeds the in-contact physical quantity and is smaller than the in-non-contact physical quantity or the physical quantity that exceeds the in-non-contact physical quantity and is smaller than the in-pressing physical quantity is measured with respect to coordinates adjacent to the focused coordinates by the measurement unit.

Accordingly, according to the instruction reception apparatus according to the seventh aspect of the invention, it is possible to prevent a state that is not a real contact state from being mistakenly discriminated as a contact state.

In the instruction reception apparatus according to any one of the third aspect to the seventh aspect of the invention, an instruction reception apparatus according to an eighth aspect of the invention is configured so that the first capacitor is formed for each set of coordinates provided to the instruction reception surface, and the output unit outputs the non-contact state signal in a case where the physical quantity that exceeds the in-contact physical quantity and is equal to or smaller than the in-non-contact physical quantity is measured with respect to the focused coordinates among the coordinates by the measurement unit, and in a case where the in-non-contact physical quantity is measured with respect to coordinates adjacent to the focused coordinates by the measurement unit.

Accordingly, according to the instruction reception apparatus according to the eighth aspect of the invention, it is possible to prevent a state that is not a real non-contact state from being mistakenly discriminated as a non-contact state.

In the instruction reception apparatus according to any one of the first aspect to the eighth aspect of the invention, an instruction reception apparatus according to a ninth aspect of the invention is configured so that the physical quantity is a discharge time of the second capacitor.

Accordingly, according to the instruction reception apparatus according to the ninth aspect of the invention, compared with a case where both of an electrostatic capacitance and a resistance value of a resistive membrane are measured, it is possible to promptly discriminate between a contact state, a non-contact state, and a pressing state of an indicator with respect to an instruction reception surface.

In the instruction reception apparatus according to any one of the first aspect to the eighth aspect of the invention, an instruction reception apparatus according to a tenth aspect of the invention is configured so that the physical quantity is a voltage of the second capacitor.

Accordingly, according to the instruction reception apparatus according to the tenth aspect of the invention, compared with a case where both of an electrostatic capacitance and a resistance value of a resistive membrane are measured, it is possible to promptly discriminate between a contact state, a non-contact state, and a pressing state of an indicator with respect to an instruction reception surface.

In the instruction reception apparatus according to any one of the first aspect to the tenth aspect of the invention, an instruction reception apparatus according to an eleventh aspect of the invention is configured so that the pair of electrodes are a pair of comb electrodes each having a comb portion, the first capacitor is a capacitor formed so that the comb portions of both of the pair of comb electrodes are alternately disposed, and the resistor is disposed at a position where a resistance value between the comb portions of both of the pair of comb electrodes is changeable as the instruction reception surface is pressed.

Accordingly, according to the instruction reception apparatus according to the eleventh aspect of the invention, compared with a case where a pair of electrodes are disposed in a vertical direction in an overlapping manner and a resistor is interposed between the electrodes, it is possible to make the thickness thin.

In the instruction reception apparatus according to any one of the first aspect to the eleventh aspect of the invention, an instruction reception apparatus according to a twelfth aspect of the invention is configured so that the first capacitor is formed for each set of coordinates provided to the instruction reception surface.

Accordingly, according to the instruction reception apparatus according to the twelfth aspect of the invention, it is possible to discriminate between a contact state, a non-contact state, and a pressing state of an indicator with respect to an instruction reception surface, for each set of coordinates provided to the instruction reception surface.

An information processing apparatus according to a thirteenth aspect of the invention comprises: an instruction reception apparatus according to any one of the first aspect to the twelfth aspect; and an execution unit that executes processes respectively corresponding to the contact state signal, the non-contact state signal, and the in-pressing state signal output from the output unit included in the instruction reception apparatus.

Accordingly, according to the information processing apparatus according to the thirteenth aspect of the invention, compared with a case where a physical quantity is measured by selectively using an electrostatic capacitance system and a resistive membrane system, it is possible to easily discriminate between a contact state, a non-contact state, and a pressing state of an indicator with respect to an instruction reception surface.

According to the information processing apparatus according to the thirteenth aspect of the invention, compared with a case where a physical quantity is measured by selectively using an electrostatic capacitance system and a resistive membrane system, it is possible to execute a process corresponding to each of a contact state, a non-contact state, and a pressing state of an indicator with respect to an instruction reception surface with a simple configuration.

In the information processing apparatus according to the thirteenth aspect of the invention, an information processing apparatus according to a fourteenth aspect of the invention is configured so that the execution unit executes a process corresponding to an intermittent pressing operation of repeating the contact state and the pressing state in a case where the non-contact state signal is not output and the pressing state signal is output before and after the contact state signal is output from the output unit within a predetermined time.

Accordingly, according to the information processing apparatus according to the fourteenth aspect of the invention, compared with a case where a physical quantity is measured by selectively using an electrostatic capacitance system and a resistive membrane system, it is possible to execute a process corresponding to an intermittent pressing operation with a simple configuration.

A signal processing method according to a fifteenth aspect of the invention comprises: measuring a physical quantity corresponding to the amount of electric charges of a second capacitor included in an instruction reception apparatus including an instruction reception surface that receives an instruction, and a charge accumulation unit that includes a first capacitor in which a pair of electrodes are disposed to face each other under the instruction reception surface, a resistor that is disposed to correspond to the pair of electrodes under the instruction reception surface and has a resistance value between the pair of electrodes that is changed as the instruction reception surface is pressed, and the second capacitor that is connected to the first capacitor; and selectively outputting a contact state signal indicating a contact state where an indicator is in contact with the instruction reception surface, a non-contact state signal indicating a non-contact state where the indicator is not in contact with the instruction reception surface, and a pressing state signal indicating a pressing state where the indicator presses against the instruction reception surface, in accordance with the measured physical quantity.

According to the signal processing method according to the fifteenth aspect of the invention, compared with a case where a physical quantity is measured by selectively using an electrostatic capacitance system and a resistive membrane system, it is possible to easily discriminate between a contact state, a non-contact state, and a pressing state of an indicator with respect to an instruction reception surface.

A program according to a sixteenth aspect of the invention causes a computer to execute processes comprising: measuring a physical quantity corresponding to the amount of electric charges of a second capacitor included in an instruction reception apparatus including an instruction reception surface that receives an instruction, and a charge accumulation unit that includes a first capacitor in which a pair of electrodes are disposed to face each other under the instruction reception surface, a resistor that is disposed to correspond to the pair of electrodes under the instruction reception surface and has a resistance value between the pair of electrodes that is changed as the instruction reception surface is pressed, and the second capacitor that is connected to the first capacitor; and selectively outputting a contact state signal indicating a contact state where an indicator is in contact with the instruction reception surface, a non-contact state signal indicating a non-contact state where the indicator is not in contact with the instruction reception surface, and a pressing state signal indicating a pressing state where the indicator presses against the instruction reception surface, in accordance with the measured physical quantity.

According to the program according to the sixteenth aspect of the invention, compared with a case where a physical quantity is measured by selectively using an electrostatic capacitance system and a resistive membrane system, it is possible to easily discriminate between a contact state, a non-contact state, and a pressing state of an indicator with respect to an instruction reception surface.

According to an embodiment of the invention, compared with a case where a physical quantity is measured by selectively using an electrostatic capacitance system and a resistive membrane system, an effect that it is possible to easily discriminate between a contact state, a non-contact state, and a pressing state of an indicator with respect to an instruction reception surface is obtained.

BRIEF DESCRIPTION OF THE DRAWINGS

Exemplary embodiments according to the technique of the present disclosure will be described in detail based on the following figures, wherein:

FIG. 3 shows a schematic plan view and a schematic side view of parts including a first comb electrode, a second comb electrode, and a carbon sheet corresponding to one set of coordinates in a touch panel in a state where an indicator is in contact with a touch panel included in the smart device according to the first and second embodiments;

FIG. 4 shows a schematic plan view and a schematic side view of the parts including the first comb electrode, the second comb electrode, and the carbon sheet corresponding to one set of coordinates in the touch panel in a state where the indicator is pressed with respect to the touch panel included in the smart device according to the first and second embodiments;

FIG. 5 shows a schematic plan view and a schematic side view of the parts including the first comb electrode, the second comb electrode, and the carbon sheet corresponding to one set of coordinates in the touch panel in a state where the indicator is pressed with respect to the touch panel by a pressing force stronger than that in the state shown in FIG. 4;

DETAILED DESCRIPTION

Hereinafter, examples of embodiments according to techniques of the present disclosure will be described with reference to the accompanying drawings. Hereinafter, for ease of description, "HiZ" in FIGS. 6 to 12, FIG. 25, and FIGS. 27 and 28 means a high impedance.

First Embodiment

Figure 1:
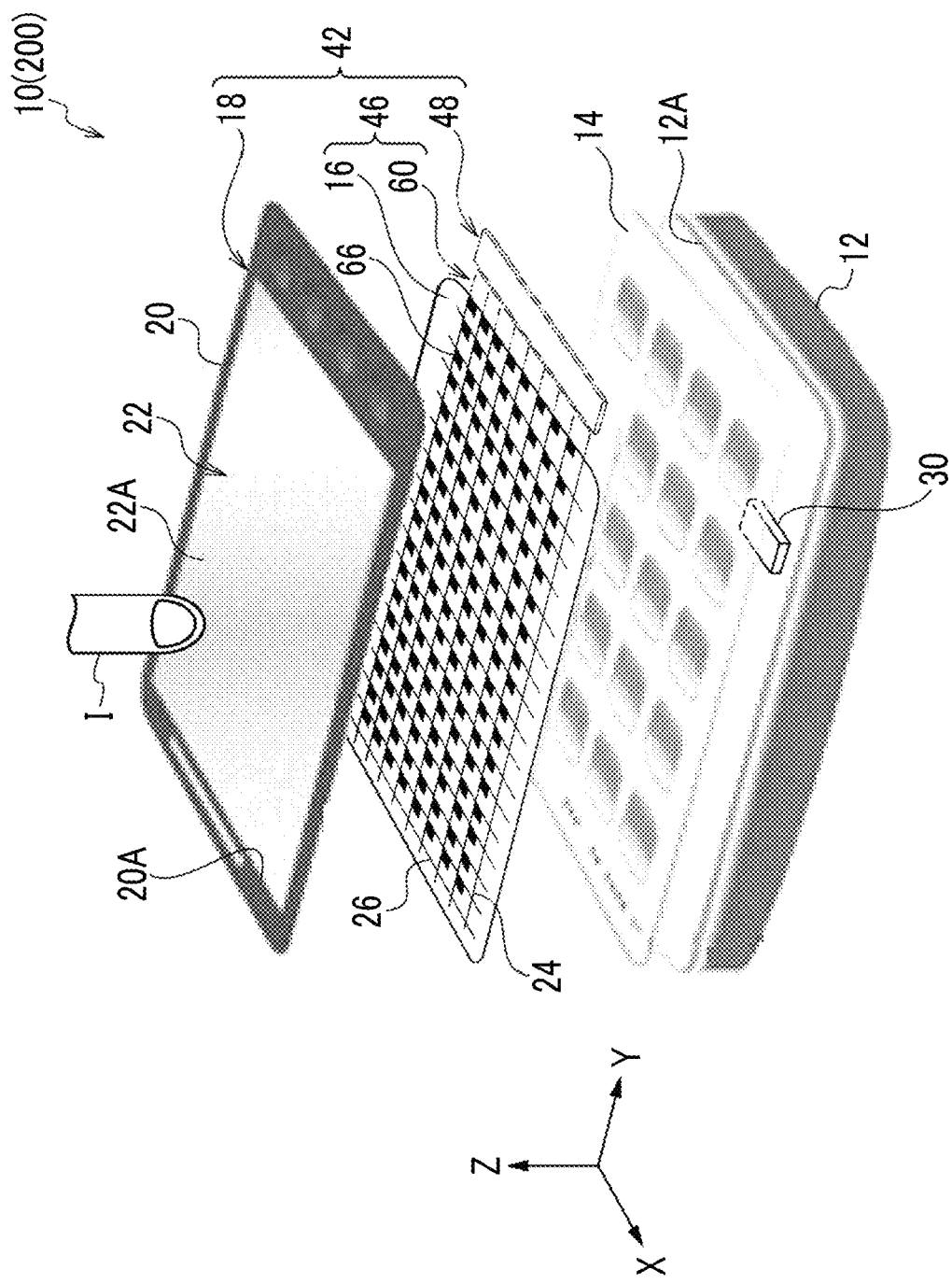
FIG. 1 is an exploded perspective view showing an example of a schematic configuration of a smart device according to first and second embodiments.

As an example, as shown in FIG. 1, a smart device 10 that is an example of an information processing apparatus according to a technique of the present disclosure includes a housing 12, a display 14, a main controller 30, and a touch panel 42 that is an example of an instruction reception apparatus according to a technique of the present disclosure.

The housing 12 is formed in a rectangular parallelepiped shape. In the housing 12, an opening portion 12A of a rectangular shape in a planar view is formed. Hereinafter, for ease of description, it is assumed that a short direction of the opening portion 12A is an X-direction, a longitudinal direction of the opening portion 12A is a Y-direction, and a direction perpendicular to the opening portion 12A is a Z-direction.

The main controller 30 is accommodated in the housing 12 through the opening portion 12A. Further, the display 14 is accommodated in the housing 12. As an example of the display 14, a liquid crystal display (LCD) is used, but the invention is not limited thereto. For example, other displays such as an organic electroluminescent display or a plasma display may be used.

A touch panel 42 is disposed on the display 14 in an overlapping manner. The touch panel 42 includes a front cover 18, a charge accumulation unit 46, and a large scale integrated circuit (LSI) 48.

The front cover 18 includes a frame 20 and a plate 22. The shape and the size of the frame 20 are designed to correspond to the shape and the size of the opening portion 12A of the housing 12, and an opening portion 20A of a rectangular shape is formed in the frame 20.

The plate 22 that is an example of an instruction reception surface according to the technique of the present disclosure is a plate member having light transmitting properties. The plate 22 includes a planar instruction reception surface 22A, and a surface of the plate 22 is formed as the instruction reception surface 22A. The shape and the size of the plate 22 are designed to correspond to the shape and the size of the opening portion 20A of the frame 20, and the plate 22 is fitted into the opening portion 20A of the frame 20, and is fixed to the frame 20. Further, in a case where the front cover 18 is pressed with an indicator I in a state where the front cover 18 is attached to the housing 12, the plate 22 is designed to be deformed by the amount of deformation based on a pressing force.

Hereinafter, for ease of description, a position in which the indicator I is in contact with the instruction reception surface 22A is referred to as a "contact position". Further, an operation of moving the contact position on the instruction reception surface 22A is referred to as a "movement operation".

The charge accumulation unit 46 includes a sensor panel 16 and a conductive wire charge accumulation unit 60. The sensor panel 16 has light transmitting properties, and the plate 22 of the front cover 18 is disposed on the sensor panel 16 in an overlapping manner.

The sensor panel 16 includes a plurality of first conductive wires 24, a plurality of second conductive wires 26, and coordinate charge accumulation units 66. The first conductive wires 24 are stretched in the Y-direction and are disposed at predetermined intervals along the X-direction. On the other hand, the second conductive wires 26 are stretched in the X-direction and are disposed at predetermined intervals along the Y-direction.

The coordinate charge accumulation units 66 are disposed in a matrix form on the sensor panel 16. That is, two-dimensional coordinates (hereinafter, simply referred to as "coordinates") are provided on the sensor panel 16, and the coordinate charge accumulation unit 66 is disposed for each set of the coordinates.

Figure 2:
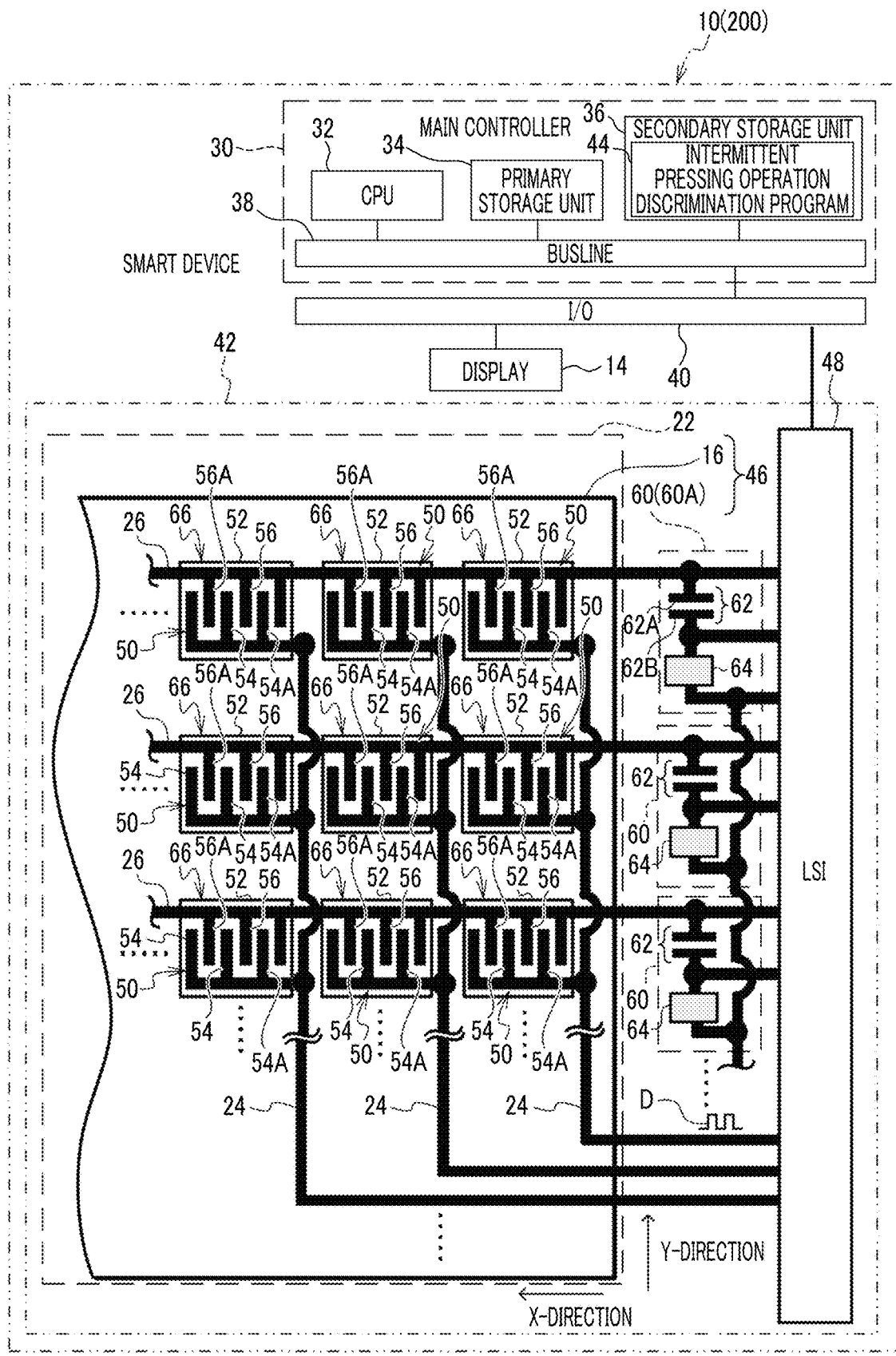
FIG. 2 is a schematic configuration diagram showing an example of configurations of main units of an electric system of the smart device according to the first and second embodiments.

For example, as shown in FIG. 2, the coordinate charge accumulation unit 66 includes a first capacitor 50 and a carbon sheet 52 of a rectangular shape in a planar view.

The first capacitor 50 is a capacitor in which a first comb electrode 54 and a second comb electrode 56 that are a pair of electrodes according to the technique of the present disclosure are disposed to face each other in an XY plane under the plate 22. The first comb electrode 54 and the second comb electrode 56 are an example of the pair of comb electrodes according to the technique of the present disclosure.

The first comb electrode 54 includes comb portions 54A, and the second comb electrode 56 includes comb portions 56A. Each comb portion 56A is disposed between the comb portions 54A. That is, the first capacitor 50 is a capacitor formed by alternately disposing the comb portions 54A and the comb portions 56A in the XY plane.

For example, as shown in FIGS. 3 to 5, the carbon sheet 52 that is an example of a resistor according to the technique of the present disclosure is disposed to correspond to the first comb electrode 54 and the second comb electrode 56 under the plate 22. In the example shown in FIGS. 3 to 5, the carbon sheet 52 is disposed to be adjacent to the first comb electrode 54 and the second comb electrode 56 in the Z-direction under the plate 22 with a spacer 58 being interposed therebetween. Further, the carbon sheet 52 is disposed at a position where a resistance value between both comb portions of the first comb electrode 54 and the second comb electrode 56, that is, between the comb portion 54A and the comb portion 54B is changeable as the instruction reception surface 22A is pressed. Accordingly, in the carbon sheet 52, as the instruction reception surface 22A is pressed, the resistance value between the first comb electrode 54 and the second comb electrode 56 is changed.

For example, as shown in FIGS. 3 to 5, the carbon sheet 52 is in contact with the comb portions 54A and 54B as the instruction reception surface 22A is pressed. For example, as shown in FIGS. 4 and 5, a contact area S of the comb portions 54A and 54B with respect to the carbon sheet 52 becomes larger as a pressing force becomes larger, and accordingly, the resistance value between the first comb electrode 54 and the second comb electrode 56 due to the carbon sheet 52 is lowered.

In the first embodiment, the carbon sheet 52 is employed, but the technique of the present disclosure is not limited thereto. For example, a rubber sheet in which conductive particles such as metal powder are scattered may be used, or a resistor of which the resistance value between the first comb electrode 54 and the second comb electrode 56 is changed as the instruction reception surface 22A is pressed may be used.

For example, as shown in FIG. 2, the first comb electrode 54 is formed to be connected to the first conductive wire 24, and the second comb electrode 56 is formed to be connected to the second conductive wire 26. The first conductive wire 24 and the second conductive wire 26 are connected to the LSI 48, and the LSI 48 outputs a drive signal D to each of the plurality of first conductive wires 24 at a predetermined cycle. The drive signal D is sequentially output to the plurality of first conductive wires 24 at predetermined time intervals from one end side to the other end side in the X-direction, for example.

The conductive wire charge accumulation unit 60 is provided for each second conductive wire 26 between the sensor panel 16 and the LSI 48. The conductive wire charge accumulation unit 60 includes a second capacitor 62 and a resistor 64, in which the second capacitor 62 includes a first electrode 62A and a second electrode 62B that are disposed to face each other.

The first electrode 62A is connected to the second conductive wire 26, and thus, is connected to the second comb electrode 56 through the second conductive wire 26. That is, the second capacitor 62 is connected in series to the first capacitor 50 on the same second conductive wire 26 through the second conductive wire 26.

The second electrode 62B is connected to one end of the resistor 64. The other end of the resistor 64 is connected to the other end of the resistor 64 of an adjacent conductive wire charge accumulation unit 60, and a connection point between the second electrode 62B and the resistor 64 is connected to the LSI 48. Further, the other end of the resistor 64 of a conductive wire charge accumulation unit 60A that is the conductive wire charge accumulation unit 60 disposed at one end in the Y-direction among the plurality of conductive wire charge accumulation units 60 is connected to the LSI 48.

The second capacitor 62 is a capacitor that functions as a so-called sampling capacitor. In a case where an electrostatic capacitance of the first capacitor 50 is represented as Cx and an electrostatic capacitance of the second capacitor 62 is represented as Cs, a relationship of "Cs>>Cx" is established.

The main controller 30 includes a central processing unit (CPU) 32 that is an example of an execution unit according to the technique of the present disclosure, a primary storage unit 34, and a secondary storage unit 36. The CPU 32 controls the entirety of the smart device 10. The primary storage unit 34 is a volatile memory used as a work area in execution of various programs, for example. As an example of the primary storage unit 34, a random access memory (RAM) may be used. The secondary storage unit 36 is a non-volatile memory that stores in advance a control program for controlling an operation of the smart device 10, various parameters, or the like. As an example of the secondary storage unit 36, an electrically erasable programmable read-only memory (EEPROM) or a flash memory may be used. The CPU 32, the primary storage unit 34, and the secondary storage unit 36 are connected to each other through a busline 38.

The smart device 10 includes an input/output interface (I/O) 40. The I/O 40 electrically connects the CPU 32 and various input/output devices to allow transmission and reception of a variety of information to be performed between the CPU 32 and the various input/output devices.

The display 14 and the touch panel 42 are connected to the I/O 40 as input/output devices, and the CPU 32 controls the display 14 so that exchange of a variety of information is performed between the display 14 and the touch panel 42.

The secondary storage unit 36 stores an intermittent pressing operation discrimination program 44. The CPU 32 reads out the intermittent pressing operation discrimination program 44 from the secondary storage unit 36 and develops the program into the primary storage unit 34. Further, the CPU 32 executes the intermittent pressing operation discrimination program 44 developed in the primary storage unit 34 to be operated as the execution unit according to the technique of the present disclosure.

That is, the CPU 32 is operated as the execution unit according to the technique of the present disclosure to execute a process corresponding to each of a contact state signal to be described later, a non-contact state signal to be described later, and a pressing state signal to be described later, output from a control circuit 70 to be described later (see FIG. 6).

Here, as the process corresponding to each of the contact state signal, the non-contact state signal, and the pressing state signal, for example, a process of discriminating between a tap operation, a flick operation, a double tap operation, a long pressing operation, a drag operation, a pinch open operation, and a pinch close operation may be used.

The tap operation refers to an operation of tapping the indicator I once with respect to the instruction reception surface 22A. The flick operation refers to an operation in which a movement distance of a movement operation is equal to or greater than a predetermined distance (for example, 2 millimeters) and the movement operation is terminated by separating the indicator I from the instruction reception surface 22A before a first set time (for example, 300 milliseconds) elapses after the movement operation is started. The double tap operation refers to an operation of tapping the indicator I twice with respect to the instruction reception surface 22A while passing through a non-contact state for a time shorter than the first set time. The drag operation refers to an operation of continuously moving a contact position for the first set time or longer.

The long pressing operation refers to an operation of contacting the indicator I with respect to the instruction reception surface 22A for a second set time (for example, one second) or longer without moving the indicator I from a contact position. The pinch open operation is also generally referred to as a pinch out operation, and refers to an operation of widening a position interval between two contact positions on the instruction reception surface 22A. The pinch close operation is also generally referred to as a pinch in operation, and refers to an operation of narrowing a position interval between two contact positions on the instruction reception surface 22A.

Further, the CPU 32 is operated as the execution unit according to the technique of the present disclosure, and executes a process corresponding to an intermittent pressing operation in a case where a non-contact state signal is not output and a pressing state signal is output before and after a contact state signal is output from the control circuit 70 within a predetermined time. Here, the intermittent pressing operation refers to an operation of repeating a contact state and a pressing state. The operation of repeating the contact state and the pressing state refers to an operation of intermittently pressing against the instruction reception surface 22A using the indicator I in a state where the indicator I is in contact with the instruction reception surface 22A.

Figure 6:
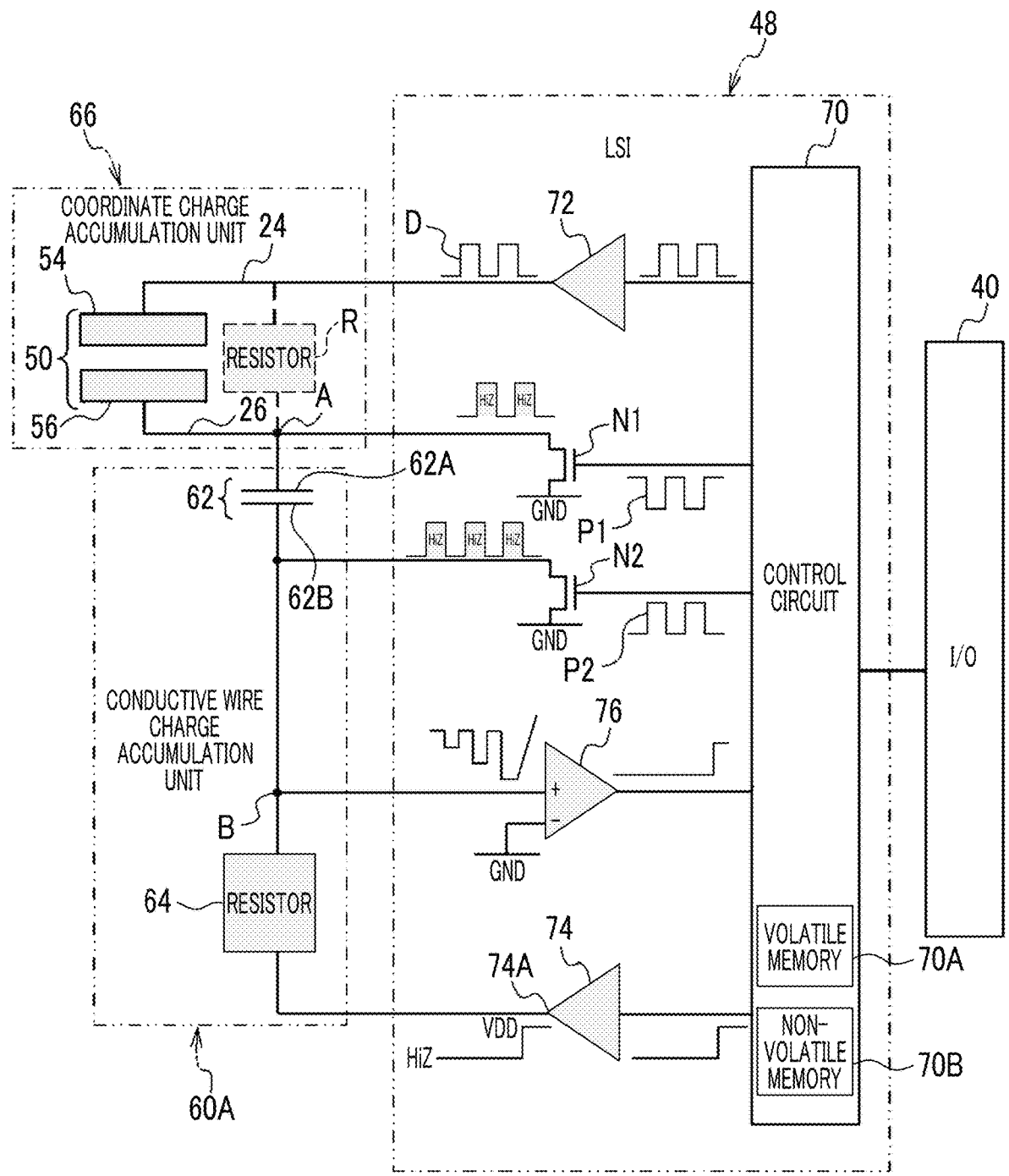
FIG. 6 is a schematic configuration diagram showing an example of configurations of main units that are a coordinate charge accumulation unit, a conductive wire charge accumulation unit, and an LSI in the touch panel included in the smart device according to the first and second embodiments.

For example, as shown in FIG. 6, the LSI 48 includes the control circuit 70, a first output buffer 72, a second output buffer 74, a comparator 76, and N-channel type metal-oxide-semiconductor (MOS) field-effect transistors N1 and N2. Hereinafter, for ease of description, the N-channel type MOS field-effect transistor is referred to as an "NMOS transistor". Further, in the example shown in FIG. 6, for ease of description, a coordinate charge accumulation unit 66 is shown in an equivalent circuit in which the carbon sheet 52 is functionally expressed as a virtual resistor R.

In the first embodiment, the control circuit 70 and the comparator 76 measure a discharge time in the second capacitor 62. The control circuit 70 and the comparator 76 correspond to an example of a measurement unit according to the technique of the present disclosure. Further, the discharge time in the second capacitor 62 is an example of a physical quantity corresponding to the amount of electric charges of the second capacitor 62.

Further, the control circuit 70 that is an example of an output unit according to the technique of the present disclosure selectively outputs a contact state signal indicating a contact state, a non-contact state signal indicating a non-contact state, and a pressing state signal indicating a pressing state, according to a measured discharge time.

In addition, the control circuit 70 includes a volatile memory 70A, and stores discharge time information (which will be described later). Further, the control circuit 70 is connected to the I/O 40. Accordingly, the control circuit 70 outputs a contact state signal, a non-contact state signal, and a pressing state signal to the main controller 30 through the I/O 40 for each set of coordinates. Furthermore, the control circuit 70 includes a non-volatile memory 70B, in which the non-volatile memory 70B stores a discharge time profile 90 (see FIG. 15) (which will be described later).

An input terminal of the first output buffer 72 is connected to the control circuit 70, and an output terminal of the first output buffer 72 is connected to the first comb electrode 54 through the first conductive wire 24. The first output buffer 72 outputs a drive signal D to the first comb electrode 54 under the control of the control circuit 70. The drive signal D is a signal based on a pulse string in which a predetermined number of pulses are included in a predetermined interval, is switched between a power source potential VDD and a ground potential GND under the control of the control circuit 70.

An input terminal of the second output buffer 74 is connected to the control circuit 70, and a slope terminal 74A that is an output terminal of the second output buffer 74 is connected to the other end of the resistor 64 included in the conductive wire charge accumulation unit 60A. In the second output buffer 74, a potential of the slope terminal 74A is selectively switched between a high impedance and the power source potential VDD under the control of the control circuit 70.

A gate of an NMOS transistor N1 is connected to the control circuit 70, and a source of the NMOS transistor N1 is at a ground potential GND. A drain of the NMOS transistor N1 is connected to the first electrode 62A. In a case where a first pulse string P1 is input to the gate of the NMOS transistor N1 from the control circuit 70, the NMOS transistor N1 is switched between ON and OFF according to the input first pulse string. Accordingly, a potential of the drain of the NMOS transistor N1 is switched between the ground potential GND and a high impedance.

A gate of an NMOS transistor N2 is connected to the control circuit 70, and a source of the NMOS transistor N2 is at a ground potential GND. A drain of the NMOS transistor N2 is connected to the second electrode 62B. In a case where a second pulse string P2 is input to the gate of the NMOS transistor N2 from the control circuit 70, the NMOS transistor N2 is switched between ON and OFF according to the input second pulse string. Accordingly, a potential of the drain of the NMOS transistor N2 is switched between the ground potential GND and a high impedance.

The second pulse string P2 is formed as a pulse string obtained by reversing the first pulse string P1. Accordingly, the potential of the drain of the NMOS transistor N1 and the potential of the drain of the NMOS transistor N2 are switched in a complementary relationship. That is, in a case where the potential of the drain of the NMOS transistor N1 is the ground potential GND, the potential of the drain of the NMOS transistor N2 becomes a high impedance, and in a case where the potential of the drain of the NMOS transistor N1 is a high impedance, the potential of the drain of the NMOS transistor N2 becomes the ground potential GND.

A non-reversion input terminal of the comparator 76 is connected to one end of the resistor 64, a reversion input terminal of the comparator 76 is at the ground potential GND, and an output terminal of the comparator 76 is connected to the control circuit 70. The output terminal of the comparator 76 selectively outputs a low level signal and a high level signal. That is, the comparator 76 outputs the low level signal in a case where a signal level of a signal input to the non-reversion input terminal is equal to or smaller than the ground potential GND, and outputs the high level signal in a case where the signal level of the signal input to the non-reversion input terminal exceeds the ground potential GND.

Next, operations of portions according to the technique of the present disclosure in the smart device 10 according to the first embodiment will be described.

First, basic operations of the charge accumulation unit 46 and the LSI 48 in a case where electric charges are accumulated in the charge accumulation unit 46 (in the case of charging) and electric charges are discharged from the charge accumulation unit 46 (in the case of discharging) will be divided into step 1 to step 4 (see FIGS. 7 to 9) for description.

Hereinafter, for ease of description, for example, as shown in FIG. 6, a connection point between the drain of the NMOS transistor N1 and the first electrode 62A is represented as a point A, and a connection point between the non-input terminal of the comparator 76 and one end of the resistor 64 is represented as a point B. Further, hereinafter, in a case where step 1 to step 4 are performed, it is assumed that a potential of the slope terminal 74A is a high impedance.

Figure 7:
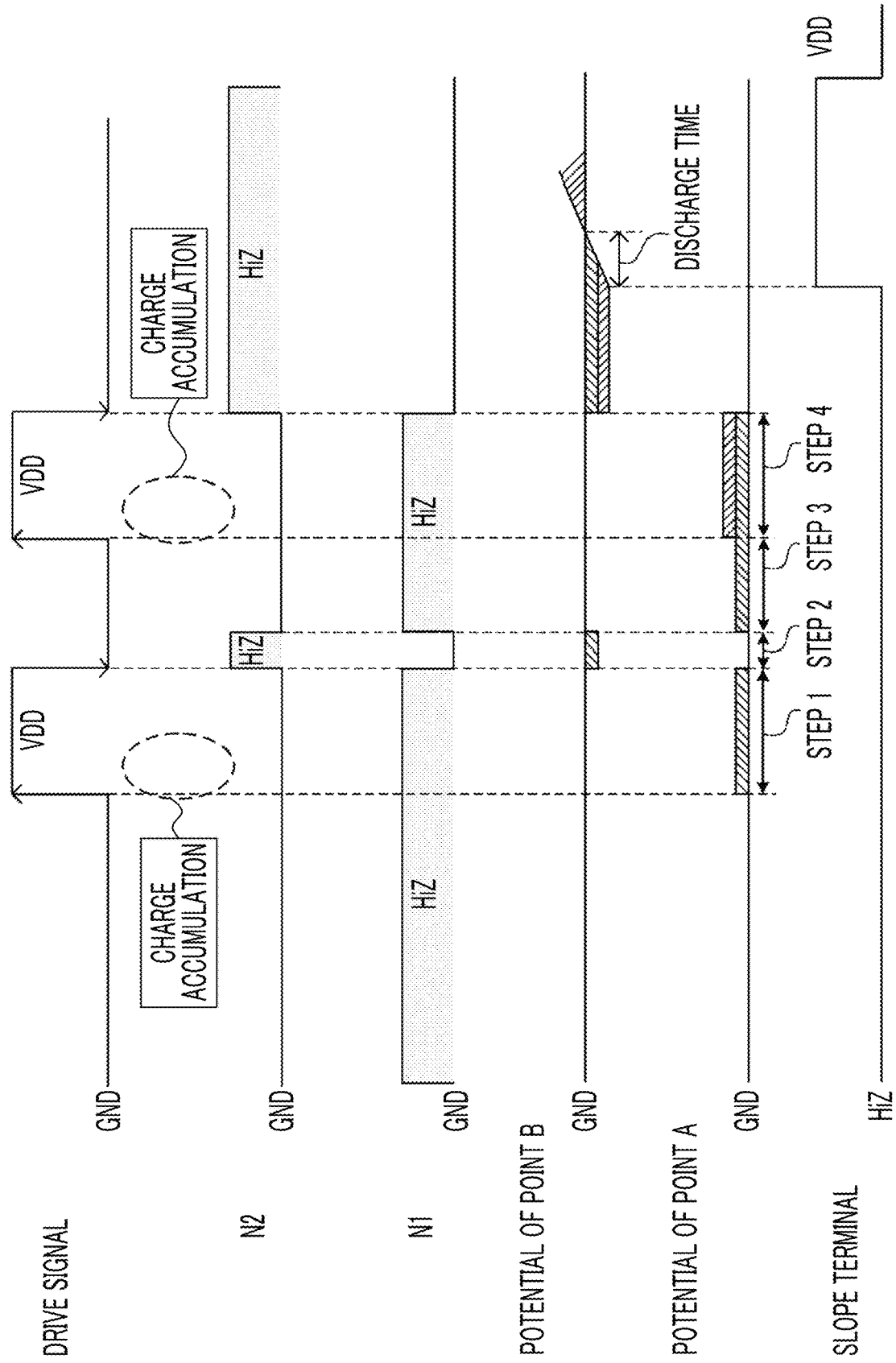
FIG. 7 is a time chart showing an example of a transition form of a potential of each of a drive signal, a drain of an NMOS transistor, a point A, a point B, and a slope terminal, in a contact state of the indicator with respect to the touch panel included in the smart device according to the first and second embodiments.
Figure 8:
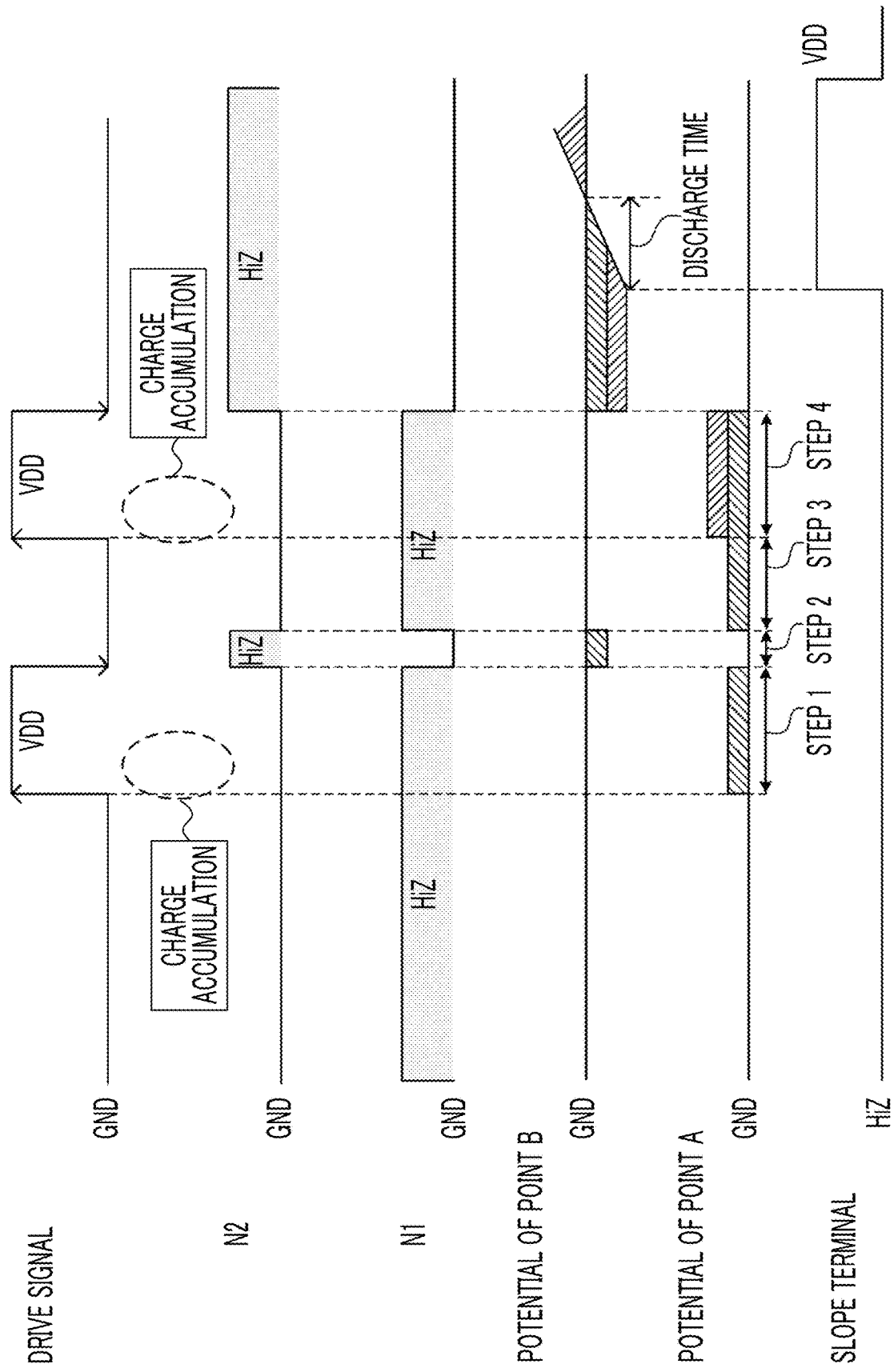
FIG. 8 is a time chart showing an example of a transition form of a potential of each of the drive signal, the drain of the NMOS transistor, the point A, the point B, and the slope terminal, in a non-contact state of the indicator with respect to the touch panel included in the smart device according to the first and second embodiments.
Figure 9:
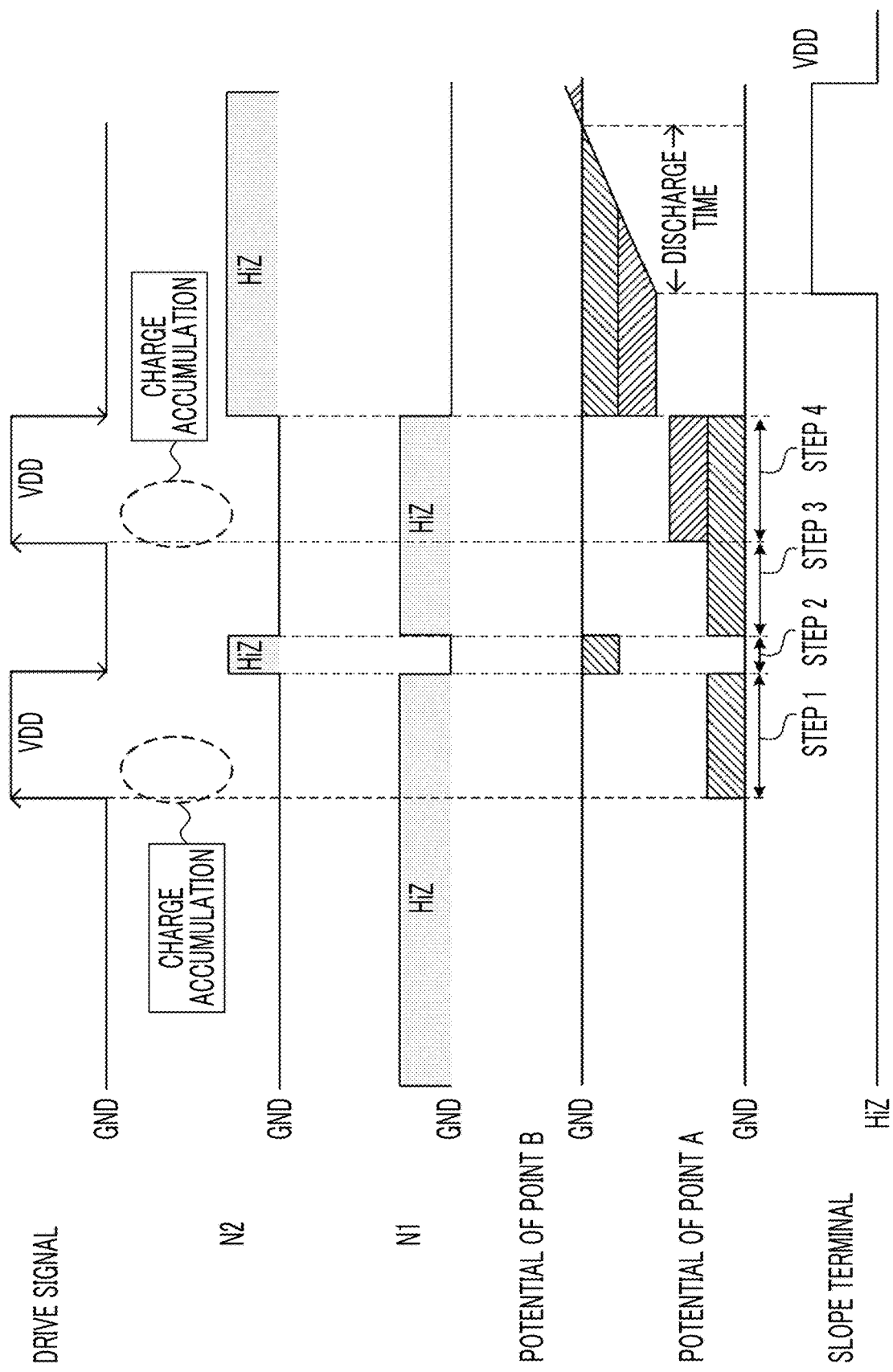
FIG. 9 is a time chart showing an example of a transition form of a potential of each of the drive signal, the drain of the NMOS transistor, the point A, the point B, and the slope terminal, in a pressing state of the indicator with respect to the touch panel included in the smart device according to the first and second embodiments.

In step 1, in a case where the NMOS transistor N1 is turned off and the NMOS transistor N2 is turned on in a state where a drive signal D output from the first output buffer 72 is at a power source potential VDD, the first capacitor 50 and the second capacitor 62 are charged. That is, for example, as shown in FIGS. 7 to 9, in a case where the potential of the drain of the NMOS transistor N1 becomes a high impedance and the potential of the drain of the NMOS transistor N2 becomes the ground potential GND in a state where the drive signal D is at the power source potential VDD, the potential of the point A rises.

Then, in step 2, in a case where the drive signal D transitions from the power source potential VDD to the ground potential GND in a state where the NMOS transistor N2 is turned off and the NMOS transistor N1 is turned on, electric charges remain in the second capacitor 62 and the point B becomes a negative potential. That is, for example, as shown in FIGS. 7 to 9, in a case where the drive signal D transitions to the ground potential GND in a state where the potential of the drain of the NMOS transistor N2 becomes the high impedance and the potential of the drain of the NMOS transistor N1 becomes the ground potential GND, the point B becomes a negative potential.

Then, in step 3, in a case where the NMOS transistor N1 is turned off and the NMOS transistor N2 is turned on in a state where the drive signal D is at the ground potential GND, electric charges of the second capacitor 62 are maintained. That is, for example, in a case where the potential of the drain of the NMOS transistor N1 transitions to the high impedance and the potential of the drain of the NMOS transistor N2 transitions to the ground potential GND in a state where the drive signal D is at the ground potential GND, the potential of the point A becomes a potential corresponding to the potential in the case of step 1.

Then, in step 4, in a case where the turn-off state of the NMOS transistor N1 and the turn-on state of the NMOS transistor N2 are maintained and the drive signal D transitions to the power source potential VDD from the ground potential GND, the first capacitor 50 and the second capacitor 62 are charged. That is, for example, as shown in FIGS. 7 to 9, in a case where the high impedance of the drain of the NMOS transistor N1 is maintained and the ground potential GND of the drain of the NMOS transistor N2 is also maintained in a state where the drive signal D is at the power source potential VDD, the potential of the point A further rises.

Figure 10:
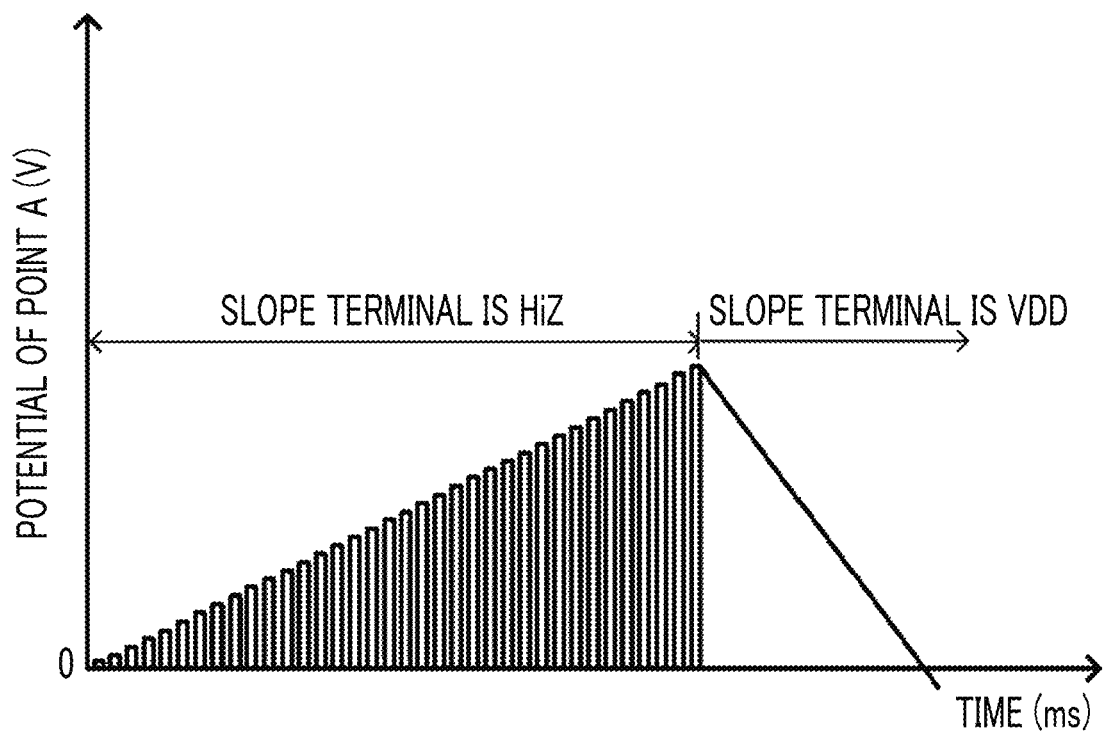
FIG. 10 is a time chart showing an example of a change form of a potential of the point A in the coordinate charge accumulation unit of the touch panel included in the smart device according to the first and second embodiments.
Figure 11:
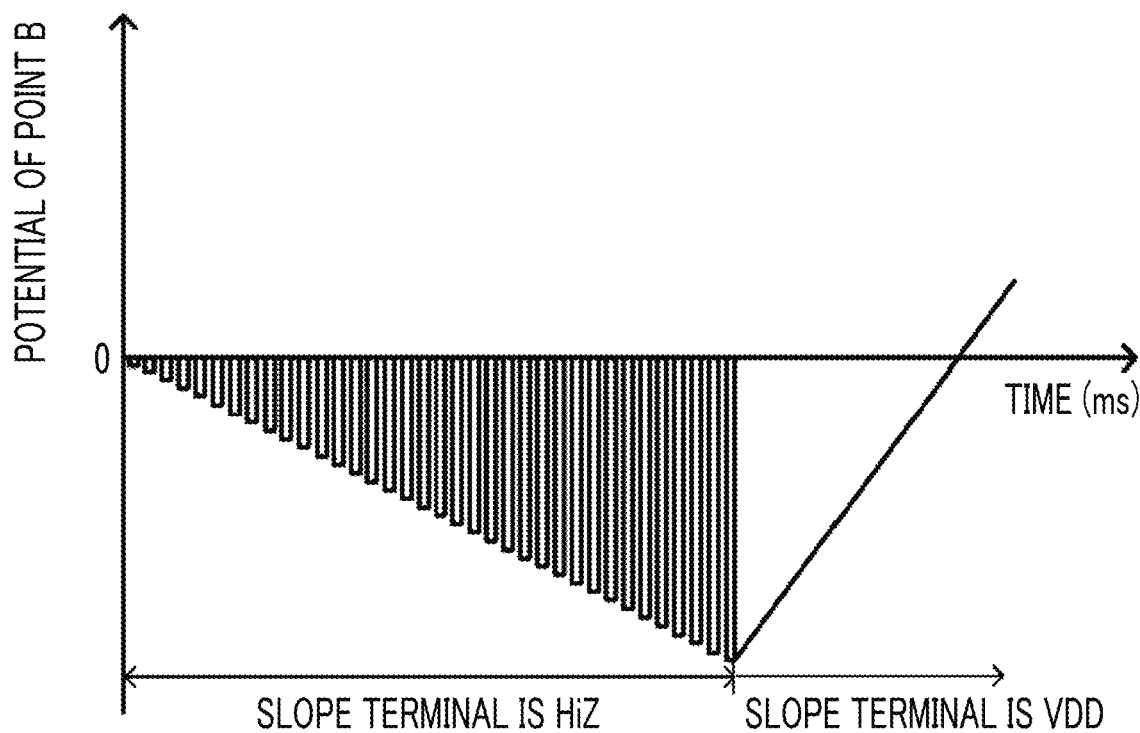
FIG. 11 is a time chart showing an example of a change form of a potential of the point B in the coordinate charge accumulation unit of the touch panel included in the smart device according to the first and second embodiments.
Figure 12:
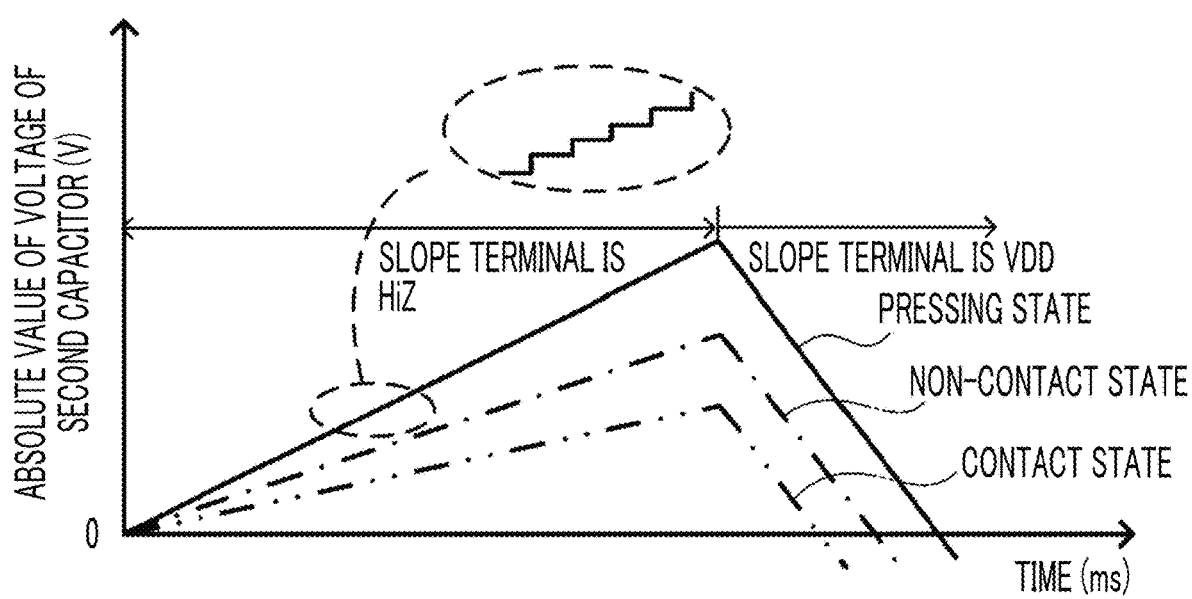
FIG. 12 is a time chart showing an example of a change form of an absolute value of a voltage of a second capacitor in a conductive wire charge accumulation unit included in the coordinate charge accumulation unit of the touch panel according to the first and second embodiments.

By repeating the operations of step 1 to step 4, the potential of the point A rises according to an electrostatic capacitance of the first capacitor 50, as shown in FIG. 10, for example, and the potential of the point B is lowered, as shown in FIG. 11, for example. Thus, for example, as shown in FIG. 12, an absolute value of a voltage of the second capacitor 62 rises.

A rising rate of the absolute value of the voltage of the second capacitor 62 in a pressing state is changed according to a press area of the indicator I with respect to the instruction reception surface 22A. For example, since the contact area S in the example shown in FIG. 5 is larger than the contact area S in the example shown in FIG. 4, in the example shown in FIG. 5, a resistance value between the first comb electrode 54 and the second comb electrode 56 is smaller than that in the case of the example shown in FIG. 4, and the rising rate of the absolute value of the voltage of the second capacitor 50 also becomes higher.

For example, as shown in FIG. 6, an increase of the contact area S is equivalent to a decrease of the resistance value of the resistor R inserted between the output terminal of the first output buffer 72 and the point A. Accordingly, since electric charges are accumulated in the second capacitor 62 through the resistor R, as the resistance value of the resistor R becomes smaller, the rising rate of the absolute value of the voltage of the second capacitor 50 becomes higher.

At a point in time when the operations of step 1 to step 4 are repeated by a predetermined number of times, in a case where the potential of the slope terminal 74A transitions to the power source potential VDD from the high impedance, discharging in the second capacitor 62 is started. In a case where the discharging in the second capacitor 62 is started, for example, as shown in FIG. 10, the potential of the point A is lowered. Further, as shown in FIG. 11, the potential of the point B rises. In addition, for example, as shown in FIG. 12, the absolute value of the voltage of the second capacitor 62 is lowered. For example, as shown in FIG. 12, a time from the time when the absolute value of the voltage of the second capacitor 62 is lowered to the time when the absolute value of the voltage of the second capacitor 62 reaches "0" is different between a pressing state, a non-contact state, and a contact state.

Further, in the control circuit 70, by using the fact that the time from the time when the absolute value of the voltage of the second capacitor 62 is lowered to the time when the absolute value of the voltage of the second capacitor 62 reaches "0" is different between the pressing state, the non-contact state, and the contact state, a measurement process and a discrimination process for discriminating between the pressing state, the non-contact state, and the contact state are executed.

Then, the measurement process executed by the control circuit 70 will be described with reference to FIG. 13. Hereinafter, for ease of description, assuming that the potential of the slope terminal 74A is at a high impedance, a case where the execution of the measurement process is started will be described. Further, hereinafter, for ease of description, assuming that the operations of step 1 to step 4 are performed in parallel, the measurement process will be described. Furthermore, hereinafter, for ease of description, a case where the measurement process is executed using one coordinate charge accumulation unit 66 as a target will be described.

Figure 13:
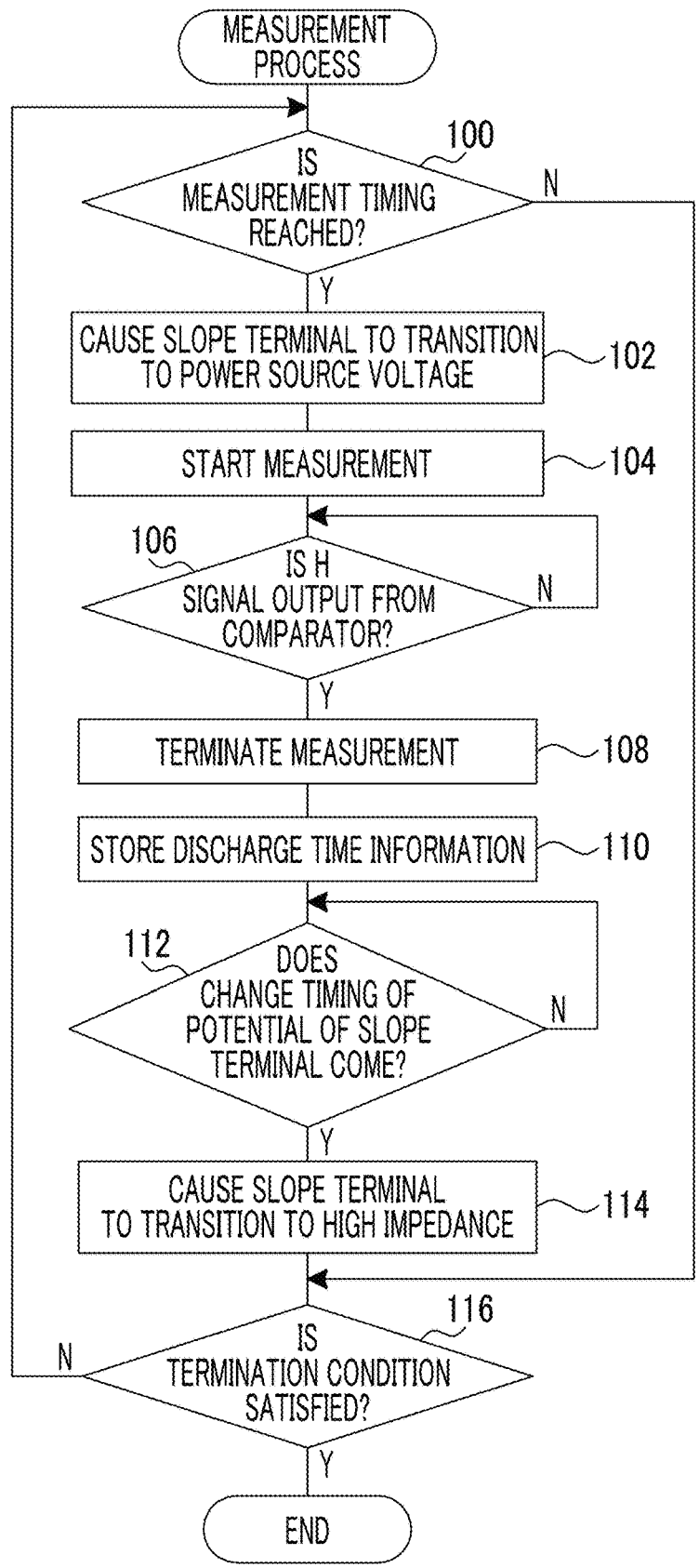
FIG. 13 is a flowchart showing an example of a flow of a measurement process executed by a control circuit of the touch panel included in the smart device according to the first embodiment.

In the measurement process shown in FIG. 13, first, in step 100, the control circuit 70 determines whether a measurement timing is reached. Here, the measurement timing refers to a timing when a discharge time in the second capacitor 62 is measured. The measurement timing is a timing between drive signals D that are successively output, for example, and reaches a fixed cycle.

In step 100, in a case where the measurement timing is reached, the determination is affirmative, and the procedure proceeds to step 102. In step 100, in a case where the measurement timing is not reached, the determination is negative, and the procedure proceeds to step 116.

In step 102, the control circuit 70 causes the potential of the slope terminal 74A to transition to the power source potential VDD from the high impedance, and then, the procedure proceeds to step 104.

In step 104, the control circuit 70 starts measurement of the discharge time in the second capacitor 62 by operating a timer (not shown), and then, the procedure proceeds to step 106.

In step 106, the control circuit 70 determines whether a high level signal is output from the comparator 76. In step 106, in a case where the high level signal is not output from the comparator 76, the determination is negative, and the determination in step 106 is performed again. In step 106, in a case where the high level signal is output from the comparator 76, the determination is affirmative, and the procedure proceeds to step 108.

In step 108, the control circuit 70 terminates the measurement of the discharge time in the second capacitor 62 by stopping the timer, and then, the procedure proceeds to step 110.

In step 110, the control circuit 70 stores discharge time information in the volatile memory 70A, and then, the procedure proceeds to step 112. Here, the discharge time information refers to information indicating a time from the time when the measurement of the discharge time in the second capacitor 62 is started in the process of step 104 to the time when the measurement of the discharge time in the second capacitor 62 is terminated in the process of step 108, that is, the time measured by the timer.

The discharge time in the second capacitor 62 varies according to the amount of electric charges accumulated in the second capacitor 62. For example, since an absolute value of a potential of the point B shown in FIG. 8 is larger than an absolute value of a potential of the point B shown in FIG. 7, the discharge time in the second capacitor 62 in the case of the example shown in FIG. 8 becomes longer than the discharge time of the second capacitor 62 in the case of the example shown in FIG. 7. Further, for example, since an absolute value of a potential of the point B shown in FIG. 9 is larger than the absolute value of the potential of the point B shown in FIG. 8, the discharge time in the second capacitor 62 in the case of the example shown in FIG. 9 becomes longer than the discharge time of the second capacitor 62 in the case of the example shown in FIG. 8.

In step 112, the control circuit 70 determines whether a predetermined change timing is reached as a change timing of the potential of the slope terminal 74A. Here, the change timing refers to a timing when the entire electric charges of the second capacitor 62 in a full charge state are dischargeable, for example, which is a timing derived from the result of a test using a real machine of the touch panel 42, or a computer simulation based on a design specification or the like of the touch panel 42, for example.

In step 112, in a case where the predetermined change timing is not reached as the change timing of the potential of the slope terminal 74A, the determination is negative, and the determination of step 112 is performed again. In step 112, in a case where the predetermined change timing is reached as the change timing of the potential of the slope terminal 74A, the determination is affirmative, and the procedure proceeds to step 114.

In step 114, the control circuit 70 causes the potential of the slope terminal 74A to transition to the high impedance from the power source potential VDD, and then, the procedure proceeds to step S116.

In step 116, the control circuit 70 determines whether a condition for terminating the measurement process is satisfied. The condition for terminating the measurement process refers to a condition that a power source switch of the smart device 10 is turned off, or a condition that a predetermined obstacle occurs as an obstacle that should not be overlooked in the LSI 48, the main controller 30, or the like, for example.

In step 116, in a case where the condition for terminating the measurement process is not satisfied, the determination is negative, and the procedure proceeds to step 100. In step 116, in a case where the condition for terminating the measurement process is satisfied, the determination is affirmative, and the measurement process is terminated.

Next, the discrimination process executed at a specific time interval (for example, an interval of 100 milliseconds) by the control circuit 70 will be described with reference to FIG. 14. Hereinafter, for ease of description, it is assumed that discharge time information is stored in advance in the volatile memory 70A. Further, hereinafter, for ease of description, a case where the control circuit 70 discriminates between a contact state, a non-contact state, and a pressing state of an indicator I with respect to a position corresponding to one set of focused coordinates in the sensor panel 16 will be described.

Figure 14:
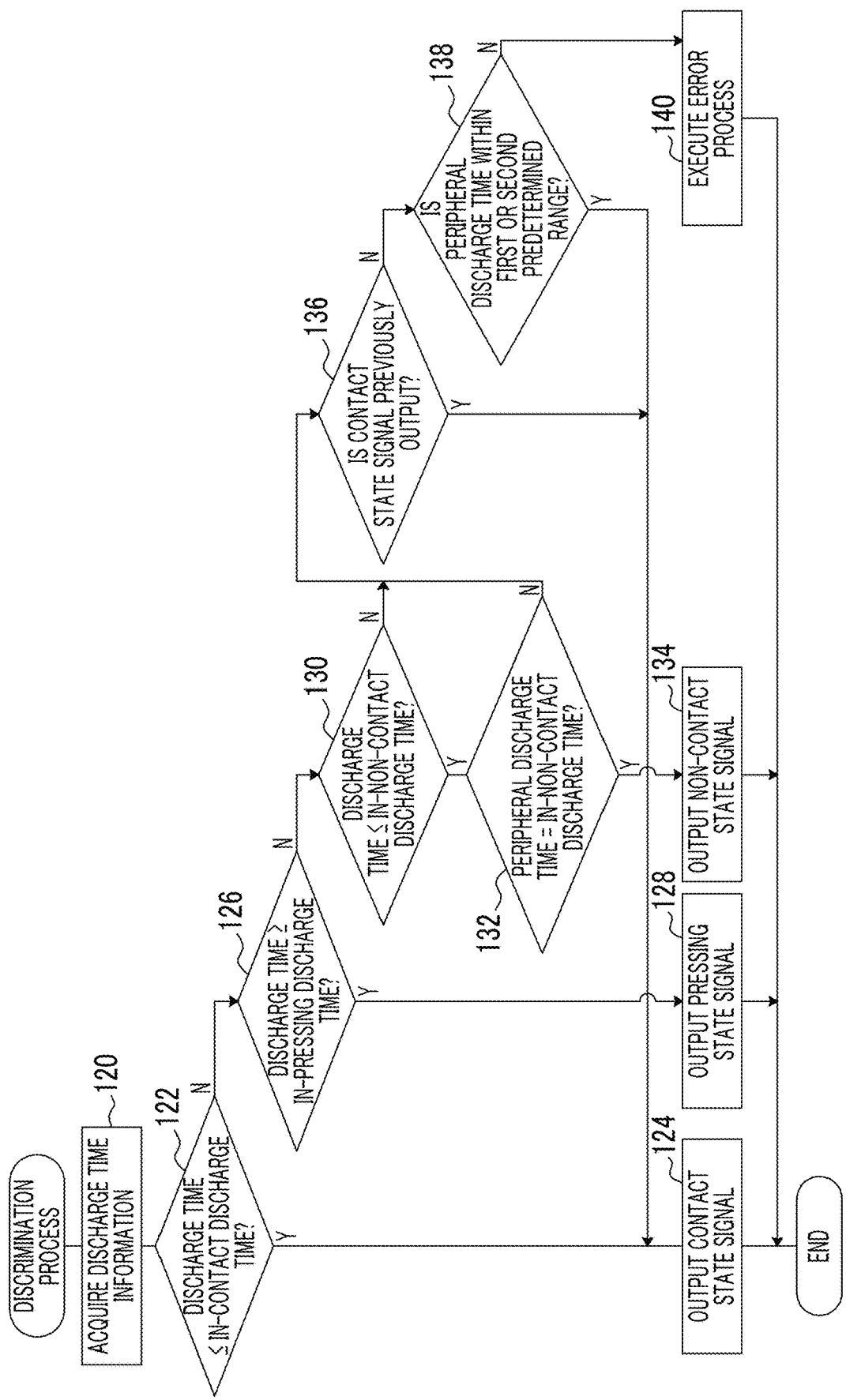
FIG. 14 is a flowchart showing an example of a flow of a discrimination process executed by the control circuit of the touch panel included in the smart device according to the first and second embodiments.

In the discrimination process shown in FIG. 14, first, in step 120, the control circuit 70 acquires discharge time information corresponding to the coordinate charge accumulation unit 66 relating to the focused coordinates from the volatile memory 70A, and then, the procedure proceeds to step 122.

Figure 15:
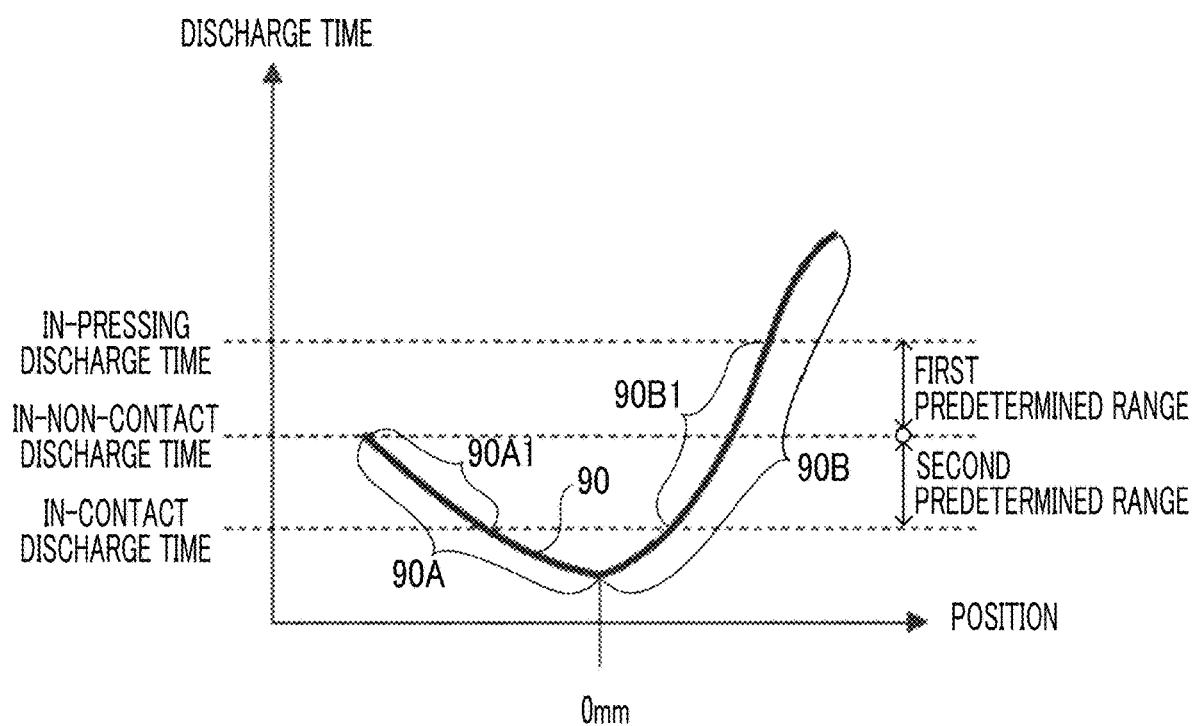
FIG. 15 shows an example of a discharge time profile used by the control circuit in a case where the discrimination process is executed by the control circuit of the touch panel included in the smart device according to the first and second embodiments.

In step 122, the control circuit 70 determines whether a discharge time indicated by the discharge time information acquired in step 120 is equal to or smaller than an in-contact discharge time on the basis of the discharge time profile 90 (see FIG. 15). Here, the in-contact discharge time is an example of a "predetermined in-contact physical quantity" according to the technique of the present disclosure. In the first embodiment, the in-contact discharge time refers to a time that is set in advance as a discharge time corresponding to the amount of electric charges of the second capacitor 62 in a contact state.

For example, as shown in FIG. 15, the in-contact discharge time is uniquely specified from the discharge time profile 90. The discharge time profile 90 is a profile indicating a relationship between the position of the indicator I with respect to the instruction reception surface 22A and the discharge time of the second capacitor 62. Further, the discharge time profile 90 is a profile derived from the result of a test using a real machine of the touch panel 42, or a computer simulation based on a design specification or the like of the touch panel 42, for example.

For example, as shown in FIG. 15, the discharge time profile 90 also regulates an in-non-contact discharge time that is an example of an in-non-contact physical quantity according to the technique of the present disclosure, and an in-pressing discharge time that is an example of an in-pressing physical quantity according to the technique of the present disclosure, in addition to the in-contact discharge time. Further, the in-non-contact discharge time and the in-pressing discharge time are also uniquely specified from the discharge time profile 90, similar to the in-contact discharge time. The in-non-contact discharge time refers to a time that is set in advance as a discharge time corresponding to the amount of electric charges of the second capacitor 62 in a non-contact state. Further, the in-pressing discharge time refers to a time that is set in advance as a discharge time corresponding to the amount of electric charges of the second capacitor 62 in a pressing state.

In the example shown in FIG. 15, a lateral axis represents the position of the indicator I, and a longitudinal axis represents the discharge time of the second capacitor 62. In the lateral axis, a position of "0 mm (millimeters)" represents a position corresponding to a reference position of the instruction reception surface 22A. The reference position of the instruction reception surface 22A refers to a position of the instruction reception surface 22A in a case where the indicator I is in the non-contact state with respect to the instruction reception surface 22A.

In the lateral axis, a position shorter than 0 mm, that is, a position on a negative side is a position spaced from the sensor panel 16 using the reference position of the instruction reception surface 22A as a boundary. Accordingly, the indicator I becomes more distant from the sensor panel 16 as the indicator I is more distant from 0 mm on the negative side. In the lateral axis, a position exceeding 0 mm, that is, a position on a positive side is a position near the sensor panel 16 using the reference position of the instruction reception surface 22A as a boundary. Accordingly, the indicator I comes closer to the sensor panel 16 as the indicator I is more distant from 0 mm on the positive side.

In the discharge time profile 90, the in-non-contact discharge time is longer than the in-contact discharge time, and the in-pressing discharge time is longer than the in-non-contact discharge time. Further, in the discharge time profile 90, a variation of the discharge time in a region where the distance from the reference position is shorter than 0 mm (a region on the negative side) is smooth compared with a variation of the discharge time in a region where the distance from the reference position exceeds 0 mm (a region on the positive side).

In step 122, in a case where the discharge time indicated by the discharge time information acquired in step 120 exceeds the in-contact discharge time, the determination is negative, and the procedure proceeds to step 126. In step 122, in a case where the discharge time indicated by the discharge time information acquired in step 120 is equal to or smaller than the in-contact discharge time, the determination is affirmative, and the procedure proceeds to step 124. Here, the case where the discharge time indicated by the discharge time information acquired in step 120 is equal to or smaller than the in-contact discharge time refers to the case of the discharge time shown in FIG. 7.

In step 124, the control circuit 70 outputs a contact state signal to the main controller 30 through the I/O 40, and then, terminates the discrimination process.

In step 126, the control circuit 70 determines whether the discharge time indicated by the discharge time information acquired in step 120 is equal to or larger than the in-pressing discharge time on the basis of the discharge time profile 90.

In step 126, in a case where the discharge time indicated by the discharge time information acquired in step 120 is shorter than the in-pressing discharge time, the determination is negative, and the procedure proceeds to step 130. In step 126, in a case where the discharge time indicated by the discharge time information acquired in step 120 is equal to or larger than the in-pressing discharge time, the determination is affirmative, and the procedure proceeds to step 128. Here, the case where the discharge time indicated by the discharge time information acquired in step 120 is equal to or larger than the in-pressing discharge time refers to the case of the discharge time shown in FIG. 9, for example.

In step 128, the control circuit 70 outputs a pressing state signal to the main controller 30 through the I/O 40, and then, terminates the discrimination process.

In step 130, the control circuit 70 determines whether the discharge time indicated by the discharge time information acquired in step 120 is equal to or smaller than the in-non-contact discharge time on the basis of the discharge time profile 90.

In step 130, in a case where the discharge time indicated by the discharge time information acquired in step 120 exceeds the in-non-contact discharge time, the determination is negative, and the procedure proceeds to step 136. In step 130, in a case where the discharge time indicated by the discharge time information acquired in step 120 is equal to or smaller than the in-non-contact discharge time, the determination is affirmative, and the procedure proceeds to step 132. Here, the case where the discharge time indicated by the discharge time information acquired in step 120 is equal to or smaller than the in-non-contact discharge time refers to the case of the discharge time shown in FIG. 8, for example.

In step 132, the control circuit 70 determines whether a peripheral discharge time is the in-non-contact discharge time on the basis of the discharge time profile 90. Here, the peripheral discharge time refers to a discharge time in the second capacitor 62 included in the coordinate charge accumulation unit 66 corresponding to one set of coordinates adjacent to the focused coordinates. The peripheral discharge time used in step 132 is a discharge time indicated by the discharge time information acquired by the control circuit 70 from the volatile memory 70A, which is discharge time information corresponding to the coordinate charge accumulation unit 66 relating to one set of coordinates adjacent to the focused coordinates.

In step 132, in a case where the discharge time indicated by the discharge time information acquired in step 120 is the in-non-contact discharge time, the determination is affirmative, and the procedure proceeds to step 134. In step 132, in a case where the discharge time indicated by the discharge time information acquired in step 120 is not the in-non-contact discharge time, the determination is negative, and the procedure proceeds to step 136.

In step 134, the control circuit 70 outputs a non-contact state signal to the main controller 30 through the I/O 40, and then, terminates the discrimination process.

In step 136, the control circuit 70 determines whether a contact state signal is output in execution of a previous discrimination process with respect to the focused coordinates.

In step 136, in a case where the contact state signal is output in execution of the previous discrimination process with respect to the focused coordinates, the determination is affirmative, and the procedure proceeds to step 124. In step 136, in a case where the contact state signal is not output in execution of the previous discrimination process with respect to the focused coordinates, the determination is negative, and the procedure proceeds to step 138.

In step 138, the control circuit 70 determines whether or not the peripheral discharge time is within a first predetermined range (see FIG. 15) or a second predetermined range (see FIG. 15). Here, the first predetermined range refers to a range that exceeds the in-non-contact discharge time and is smaller than the in-pressing discharge time, in the discharge time profile 90. Further, the second predetermined range refers to a range that exceeds the in-contact discharge time and is smaller than the in-non-contact discharge time, in the discharge time profile 90.

In step 138, in a case where the peripheral discharge time is within the first predetermined range or the second predetermined range, the determination is affirmative, and the procedure proceeds to step 124. In step 138, in a case where the peripheral discharge time is not within the first predetermined range or the second predetermined range (in a case where the peripheral discharge time is out of the first predetermined range and is out of the second predetermined range), the determination is negative, and the procedure proceeds to step 140.

In step 140, the control circuit 70 executes an error process, and then, terminates the discrimination process. Here, the error process refers to a process of outputting none of the contact state signal, the pressing state signal, and the non-contact state signal.

In the first embodiment, in step 140, the control circuit 70 executes the error process, but the technique of the present disclosure is not limited thereto. For example, instead of the process of step 140, the control circuit 70 may apply a process of outputting a specific signal among the contact state signal, the pressing state signal, and the non-contact state signal.

Next, an intermittent pressing operation discrimination process realized by executing the intermittent pressing operation discrimination program 44 using the CPU 32 in a case where a pressing state signal is input to the CPU 32 from the control circuit 70 will be described with reference to FIG. 16. Hereinafter, for ease of description, in a case where it is not necessary to distinguish a contact state signal, a non-contact state signal, and a pressing state signal, the signals are referred to "state signals".

Figure 16:
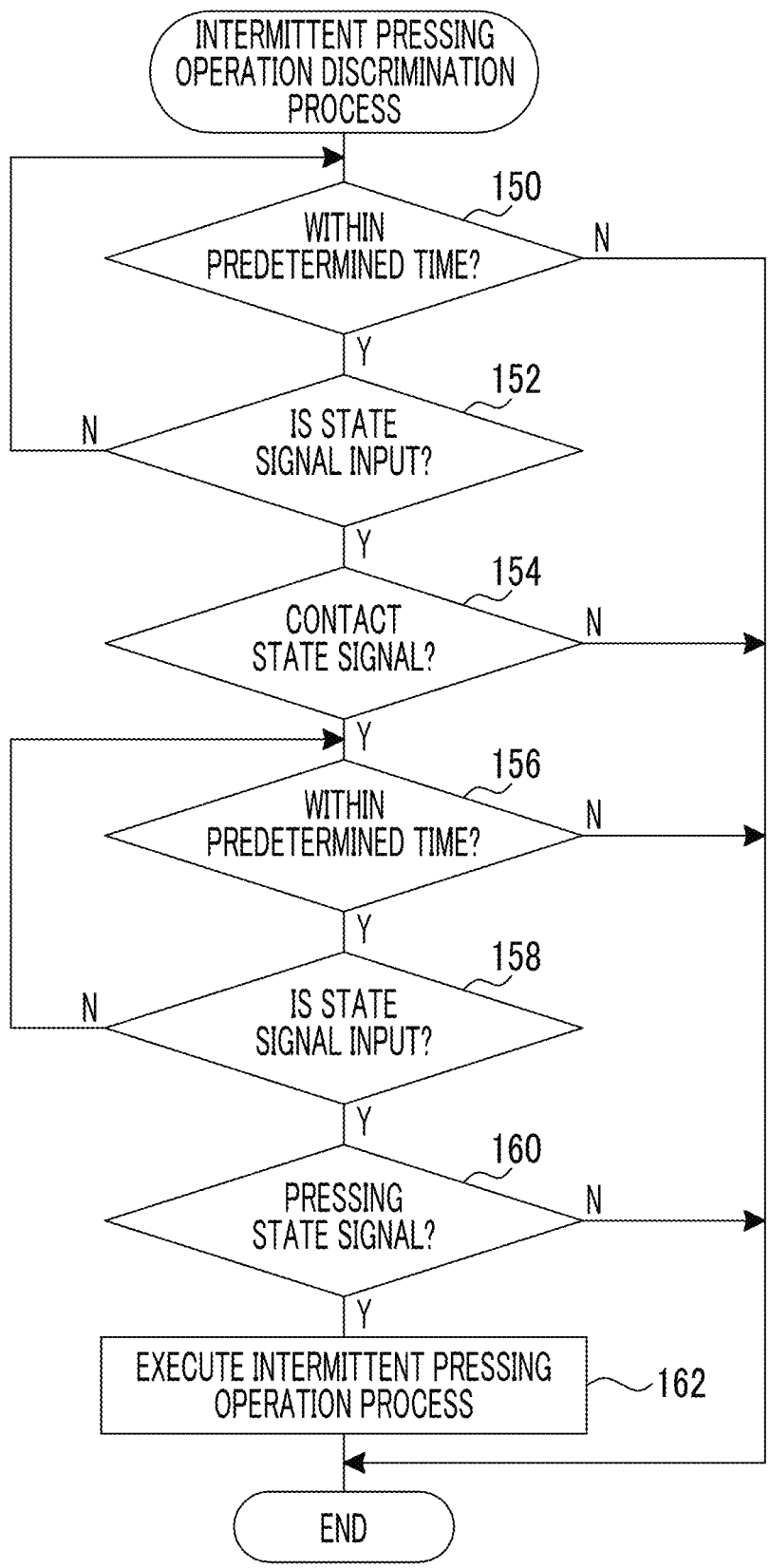
FIG. 16 is a flowchart showing an example of a flow of an intermittent pressing operation discrimination process realized by executing an intermittent pressing operation discrimination program with a CPU of a main controller included in the smart device according to the first and second embodiments.

In the intermittent pressing operation discrimination process shown in FIG. 16, first, in step 150, the CPU 32 determines whether a time that elapses after a pressing state signal is input is within a predetermined time. Here, the predetermined time refers to a time corresponding to a half of a time necessary for completing a one-time double tap operation, which is a time derived from a result of a test using a real machine of the touch panel 42, or a computer simulation based on a design specification or the like of the touch panel 42, for example. The time corresponding to the half of the time necessary for the double tap operation refers to a half of a necessary time from a first tap to a second tap in the double tap operation, and in the first embodiment, for example, refers to a half of the above-described first set time.

In step 150, in a case where the time that elapses after the pressing state signal is input is not within the predetermined time, the determination is negative, and the intermittent pressing operation discrimination process is terminated. In step 150, in a case where the time that elapses after the pressing state signal is input is within the predetermined time, the determination is affirmative, and the procedure proceeds to step 154.

In step 152, the CPU 32 determines whether a state signal is input from the control circuit 70. In step 152, in a case where the state signal is not input from the control circuit 70, the determination is negative, and the procedure proceeds to step 150. In step 152, in a case where the state signal is input from the control circuit 70, the determination is affirmative, and the procedure proceeds to step 154.

In step 154, the CPU 32 determines whether the state signal for which it is determined that the state signal is "input" in execution of the process of step 152 is a contact state signal. In step 154, in a case where the state signal for which it is determined that the state signal is "input" in the execution of the process of step 152 is not the contact state signal, the determination is negative, and the intermittent pressing operation discrimination process is terminated. In step 154, in a case where the state signal for which it is determined that the state signal is "input" in the execution of the process of step 152 is the contact state signal, the determination is affirmative, and the procedure proceeds to step 156.

In step 156, the CPU 32 determines whether a time that elapses after the state signal for which it is determined that the state signal is "input" in the execution of the process of step 152 is within a predetermined time. In step 156, in a case where the time that elapses after the state signal for which it is determined that the state signal is "input" in the execution of the process of step 152 is not within the predetermined time, the determination is negative, and the intermittent pressing operation discrimination process is terminated. In step 156, in a case where the time that elapses after the state signal for which it is determined that the state signal is "input" in the execution of the process of step 152 is within the predetermined time, the determination is affirmative, and the procedure proceeds to step 158.

In step 158, the CPU 32 determines whether a state signal is input from the control circuit 70. In step 158, in a case where the state signal is not input from the control circuit 70, the determination is negative, and the intermittent pressing operation discrimination process is terminated. In step 158, in a case where the state signal is input from the control circuit 70, the determination is affirmative, and the procedure proceeds to step 160.

In step 160, the CPU 32 determines whether the state signal for which it is determined that the state signal is "input" in execution of the process of step 158 is a pressing state signal. In step 160, in a case where the state signal for which it is determined that the state signal is "input" in the execution of the process of step 158 is not the pressing state signal, the determination is negative, and the intermittent pressing operation discrimination process is terminated. In step 160, in a case where the state signal for which it is determined that the state signal is "input" in the execution of the process of step 158 is the pressing state signal, the determination is affirmative, and the procedure proceeds to step 162.

In step 162, the CPU 32 executes an intermittent pressing operation process that is a predetermined process as a process corresponding to an intermittent pressing operation, and then, terminates the intermittent pressing operation discrimination process. Here, as an example of the intermittent pressing operation process, a specific process with respect to a specific application that is already installed in the smart device 10, a process of storing coordinates of a position where the intermittent pressing operation is performed in the secondary storage unit 36 in a time series manner, or the like, may be used.

As described above, in the touch panel 42, a discharge time in the second capacitor 62 is measured by the control circuit 70. Further, a contact state signal, a non-contact state signal, and a pressing state signal are selectively output in accordance with the measured discharge time by the control circuit 70. Accordingly, according to the touch panel 42, compared with a case where a physical quantity is measured by selectively using an electrostatic capacitance system and a resistive membrane system, it is possible to easily discriminate between a contact state, a non-contact state, and a pressing state of the indicator I with respect to the instruction reception surface 22A.

Further, in the touch panel 42, in a case where a discharge time corresponding to an in-contact discharge time is measured by the control circuit 70 (Y in step 122), a contact state signal is output. In addition, in a case where a discharge time corresponding to an in-non-contact discharge time is measured by the control circuit 70 (Y in step 132), an non-contact state signal is output. Furthermore, in a case where a discharge time corresponding to an in-pressing discharge time is measured by the control circuit 70 (Y in step 126), a pressing state signal is output. Accordingly, according to the touch panel 42, compared with a case where both of an electrostatic capacitance and a resistance value of a resistive membrane are measured, it is possible to promptly discriminate between a contact state, a non-contact state, and a pressing state of the indicator I with respect to the instruction reception surface 22A.

Further, in the touch panel 42, on the basis of the discharge time profile 90 in which an in-non-contact discharge time is regulated to be longer than an in-contact discharge time and an in-pressing discharge time is regulated to be longer than the in-non-contact discharge time, a contact state signal, a non-contact state signal, and a pressing state signal are selectively output. Accordingly, according to the touch panel 42, compared with a case where the discharge time profile 90 is not used, it is possible to discriminate between a contact state, a non-contact state, and a pressing state of the indicator I with respect to the instruction reception surface 22A on the basis of the measured discharge time with high accuracy.

In addition, in the touch panel 42, in a case where a contact state signal is previously output, and in a case where a discharge time that is not a in-non-contact discharge time, is longer than an in-contact discharge time, and is shorter than an in-pressing discharge time is measured (Y in step 136), a contact state signal is output. Accordingly, according to the touch panel 42, it is possible to prevent a state that is not a real contact state from being mistakenly discriminated as a contact state.

Further, in the touch panel 42, in a case where a discharge time measured as a discharge time in the second capacitor 50 relating to focused coordinates is longer than an in-non-contact discharge time and is shorter than an in-pressing discharge time, the process of step 138 is executed. In addition, in a case where the peripheral discharge time is within the first predetermined range and within the second predetermined range (Y in step 138), a contact state signal is output. Accordingly, according to the touch panel 42, it is possible to prevent a state that is not a real contact state from being mistakenly discriminated as a contact state.

In the touch panel 42, in a case where the discharge time measured as the discharge time in the second capacitor 50 relating to the focused coordinates is longer than an in-contact discharge time and is equal to or shorter than the in-non-contact discharge time, the process of step 132 is executed. In addition, in a case where the peripheral discharge time is the in-non-contact discharge time (Y in step 132), a non-contact state signal is output. Accordingly, according to the touch panel 42, it is possible to prevent a state that is not a real non-contact state from being mistakenly discriminated as a non-contact state.

In the touch panel 42, the discharge time in the second capacitor 62 is measured, and the measured discharge time is compared with the discharge time profile 90. Accordingly, according to the touch panel 42, it is possible to promptly discriminate between a contact state, a non-contact state, and a pressing state of the indicator I with respect to the instruction reception surface 22A, compared with a case where both of an electrostatic capacitance and a resistance value are measured.

Further, in the touch panel 42, the first capacitor 50 formed by alternately disposing the comb portions 54A and the comb portions 56A of both of the first comb electrode 54 and the second comb electrode 56 that are a pair of comb electrodes is used. Further, the carbon sheet 52 is disposed at a position where a resistance value between the comb portions 54A and 56A is changeable as the instruction reception surface 22A is pressed. Accordingly, according to the touch panel 42, compared with a case where a pair of electrodes are disposed in a vertical direction in an overlapping manner and a resistor is interposed between the electrodes, it is possible to make the thickness thin.

Furthermore, in the smart device 10, a process (for example, processes of recognizing a tap operation, a drag operation, or the like) corresponding to each of a contact state signal, a non-contact state signal, a pressing state signal output by the control circuit 70 is executed by the CPU 32.

Accordingly, according to the smart device 10, compared with a case where a physical quantity is measured by selectively using an electrostatic capacitance system and a resistive membrane system, it is possible to execute a process corresponding to each of a contact state, a non-contact state, and a pressing state of the indicator I with respect to the instruction reception surface 22A, with a simple configuration.

Further, in the smart device 10, in a case where a non-contact state signal is not output and a pressing state signal is output before and after a contact state signal is output by the control circuit 70 within a predetermined time, a process corresponding to an intermittent pressing operation is executed by the CPU 32.

Accordingly, according to the smart device 10, compared with a case where a physical quantity is measured by selectively using an electrostatic capacitance system and a resistive membrane system, it is possible to execute a process corresponding to an intermittent pressing operation of the indicator I with respect to the instruction reception surface 22A with a simple configuration.

In the first embodiment, as an example of a peripheral discharge time, a discharge time in the second capacitor 62 included in the coordinate charge accumulation unit 66 corresponding to one set of coordinates adjacent to focused coordinates is used, but the technique of the present disclosure is not limited thereto. For example, an average value of discharge times in the respective second capacitors 62 included in the coordinate charge accumulation units 66 corresponding to a plurality of coordinates adjacent to focused coordinates, a central value thereof, or the like may be employed as the peripheral discharge time.

Second Embodiment

In the first embodiment, a case where the accuracy of determination of whether a state is a contact state using a peripheral discharge time with respect to a position corresponding to focused coordinates is enhanced has been described, but in a second embodiment, a case where the accuracy of determination of whether a state is a contact state without using a peripheral discharge time is enhanced will be described. In the second embodiment, the same reference numerals are given to the same components as the components described in the first embodiment, and description thereof will not be repeated. Only portions different from the first embodiment will be described.

By the way, for example, as shown in FIG. 15, the discharge time profile 90 is divided into a negative profile 90A and a positive profile 90B using "0 mm" as a boundary. The negative profile 90A corresponds to a portion where the position of an indicator I belongs to a region on a negative side in the discharge time profile 90, and the positive profile 90B corresponds to a portion where the position of the indicator I belongs to a region on a positive side in the discharge time profile 90.

A change in a discharge time at a range 90A1 that is equal to or longer than an in-contact discharge time in the negative profile 90A is different from a change in a discharge time at a range 90B1 that is equal to or longer than the in-contact discharge time and is equal to or shorter than an in-pressing discharge time in the positive profile 90B.

Thus, in the second embodiment, on the basis of a difference between the change in the discharge time at the range 90A1 of the negative profile 90A and the change in the discharge time at the range 90B1 of the positive profile 90B, a contact state and a non-contact state are discriminated by the control circuit 70.

In the second embodiment, in a case where a discharge time that exceeds an in-contact discharge time and is shorter than an in-pressing discharge time is measured, the control circuit 70 selectively outputs a contact state signal and a non-contact state signal in accordance with the measured discharge time.

Further, in the second embodiment, in a case where a discharge time corresponding to an in-non-contact discharge time is measured and a change in the measured discharge time represents an in-non-contact change to be described later that is an example of a predetermined change according to the technique of the present disclosure, the control circuit 70 outputs a non-contact state signal.

Figure 17:
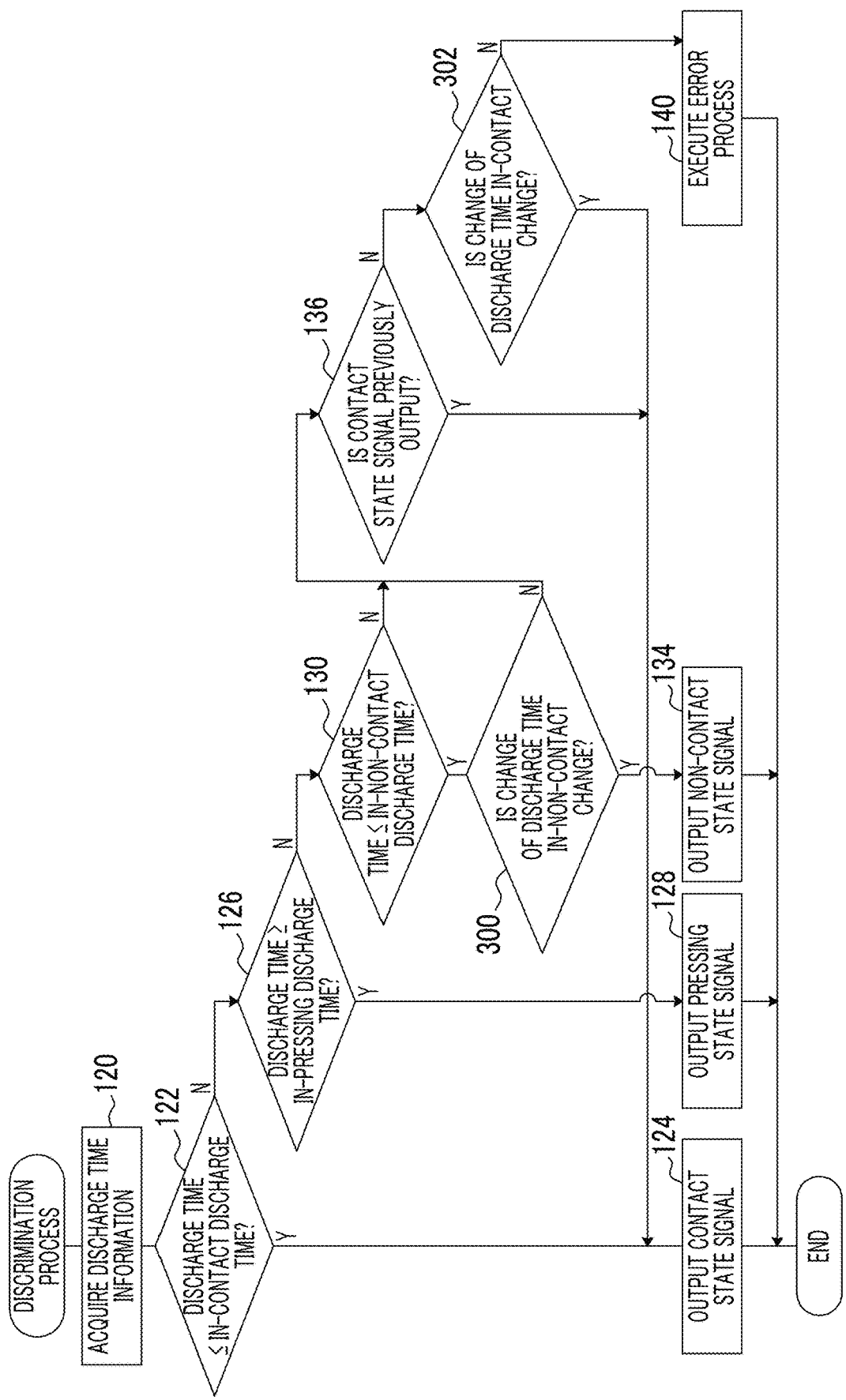
FIG. 17 is a flowchart showing an example of a flow of a discrimination process executed by the control circuit of the touch panel included in the smart device according to the second embodiment.

A smart device 200 (see FIGS. 1 and 2) according to the second embodiment is different from the smart device 10 according to the first embodiment in that the control circuit 70 executes a discrimination process shown in FIG. 17, instead of executing the discrimination process shown in FIG. 14.

Hereinafter, as operations of portions according to the technique of the present disclosure in the smart device 200 according to the second embodiment, a discrimination process executed at a specific time interval by the control circuit 70 will be described with reference to FIG. 17. The same reference step numbers are given to the same steps as in the flowchart shown in FIG. 14, and description thereof will not be repeated.

The discrimination process that is shown in FIG. 17 is different from the discrimination process shown in FIG. 14 in that step 300 is performed instead of step 132 and step 302 is performed instead of step 138.

In step 300, the control circuit 70 determines whether a change in a discharge time in the second capacitor 62 included in the coordinate charge accumulation unit 66 relating to focused coordinates is an in-non-contact change. The change in the discharge time is uniquely specified from an absolute value of a difference between a discharge time indicated by the discharge time information acquired in step 120 by execution of a previous discrimination process and a discharge time indicated by the discharge time information acquired in step 120 by execution of a current discrimination process.

Here, the in-non-contact change refers to a change in a discharge time in the second capacitors 62 at a specific time interval in a non-contact state. The in-non-contact change is uniquely specified from a value α that is derived in advance as an absolute value of a difference between discharge times in the second capacitors 62 at the specific time interval in the non-contact state. Here, the value α that is derived in advance refers to a value derived from a result of a test using a real machine of the touch panel 42, or a computer simulation based on a design specification or the like of the touch panel 42, for example, on the basis of a relationship between the position of the indicator I in the range 90A1 and a discharge time.

In step 300, in a case where the change in the discharge time in the second capacitor 62 included in the coordinate charge accumulation unit 66 relating to the focused coordinates is not the in-non-contact change, the determination is negative, and the procedure proceeds to step 136. In step 300, in a case where the change in the discharge time in the second capacitor 62 included in the coordinate charge accumulation unit 66 relating to the focused coordinates is the in-non-contact change, the determination is affirmative, and the procedure proceeds to step 134.

In step 302, the control circuit 70 determines whether the change in the discharge time in the second capacitor 62 included in the coordinate charge accumulation unit 66 relating to the focused coordinates is an in-contact change.

The in-contact change refers to a change in discharge times in the second capacitor 62 at a specific time interval in a contact state. The in-contact change is uniquely specified from a value β that is derived in advance as an absolute value of a difference between the discharge times in the second capacitors 62 at the specific time interval in the contact state. Here, the value β that is derived in advance refers to a value derived from a result of a test using a real machine of the touch panel 42, or a computer simulation based on a design specification or the like of the touch panel 42, for example, on the basis of a relationship between the position of the indicator I in the range 90B1 and a discharge time.

In step 302, in a case where the change in the discharge time in the second capacitor 62 included in the coordinate charge accumulation unit 66 relating to the focused coordinates is not the in-contact change, the determination is negative, and the procedure proceeds to step 140. In step 302, in a case where the change in the discharge time in the second capacitor 62 included in the coordinate charge accumulation unit 66 relating to the focused coordinates is the in-contact change, the determination is affirmative, and the procedure proceeds to step 124.

As described above, in the touch panel 42 according to the second embodiment, in a case where a discharge time that exceeds an in-contact discharge time and is shorter than an in-pressing discharge time is measured, a contact state signal and a non-contact state signal are selectively output in accordance with a change in the measured discharge time. Accordingly, according to the touch panel 42 according to the second embodiment, even in a case where an in-non-contact discharge time is longer than an in-contact discharge time and an in-pressing discharge time is longer than the in-non-contact discharge time as shown in the discharge time profile 90, it is possible to discriminate between a contact state and a non-contact state.

Further, in the touch panel 42 according to the second embodiment, in a case where a discharge time corresponding to an in-non-contact discharge time is measured by the control circuit 70 and a change in the measured discharge time represents an in-non-contact change (Y in step 300), a non-contact state signal is output. Accordingly, according to the touch panel 42, in a case where an in-non-contact discharge time is longer than an in-contact discharge time and an in-pressing discharge time is longer than the in-non-contact discharge time, it is possible to prevent a state that is not a real contact state from being mistakenly discriminated as a contact state even.

Figure 18:
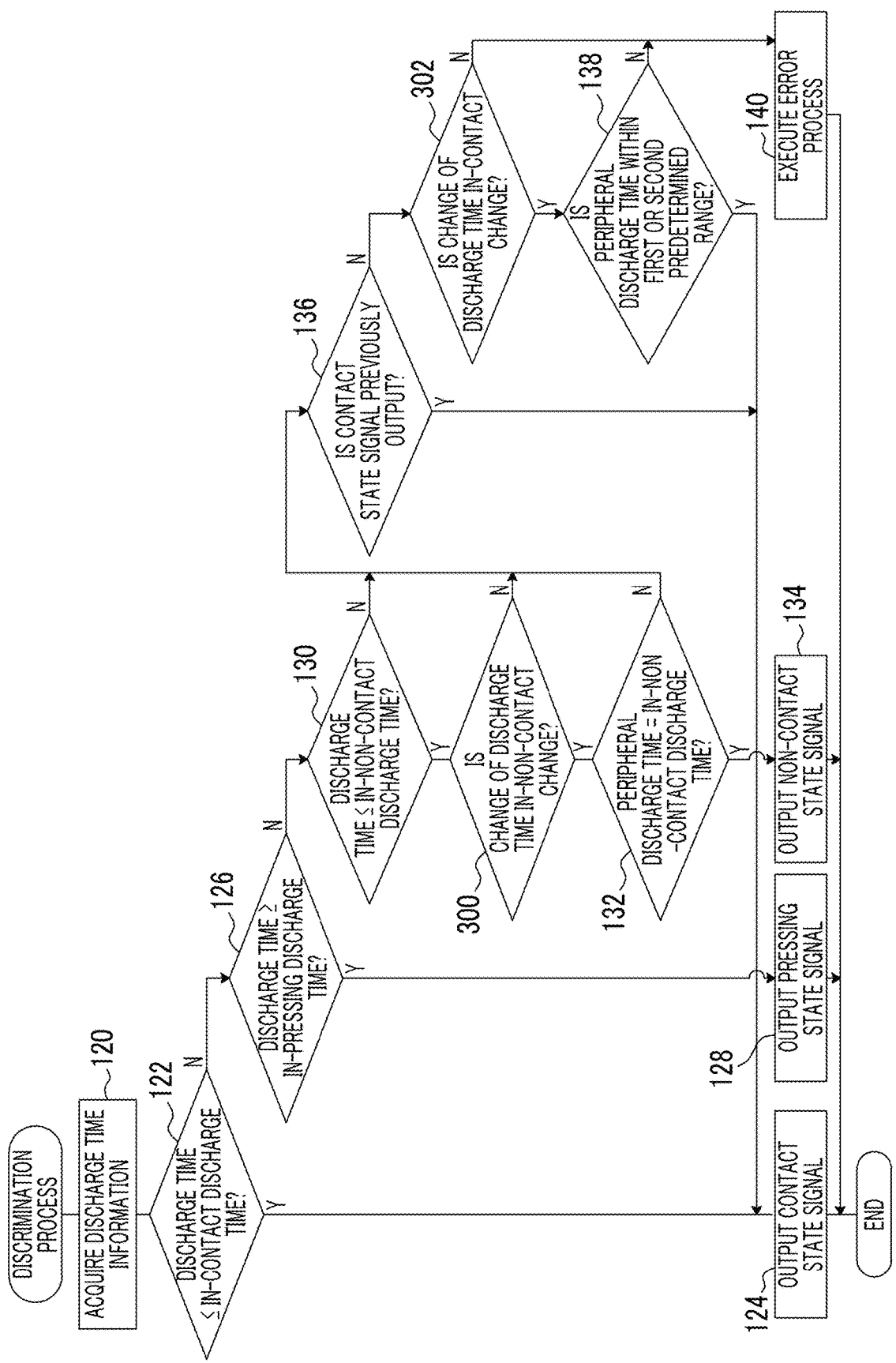
FIG. 18 is a flowchart showing a modification example of a flow of a discrimination process executed by the control circuit of the touch panel included in the smart device according to the second embodiment.

In the second embodiment, a case where the procedure proceeds to step 134 in a case where the determination is affirmative in step 300 has been described, but the technique of the present disclosure is not limited thereto. For example, as shown in FIG. 18, in a case where the determination is affirmative in step 300, the process of step 132 included in the discrimination process according to the first embodiment may be executed. In the example shown in FIG. 18, in a case where the determination is negative in step 132, the procedure proceeds to step 136, and in a case where the determination is affirmative in step 132, the procedure proceeds to step 134.

Further, in the second embodiment, a case where the procedure proceeds to step 124 in a case where the determination is affirmative in step 302 has been described, but the technique of the present disclosure is not limited thereto. For example, as shown in FIG. 18, in a case where the determination is affirmative in step 302, the process of step 138 included in the discrimination process according to the first embodiment may be executed. In the example shown in FIG. 18, in a case where the determination is negative in step 138, the procedure proceeds to step 140, and in a case where the determination is affirmative in step 138, the procedure proceeds to step 124.

Figure 19A:
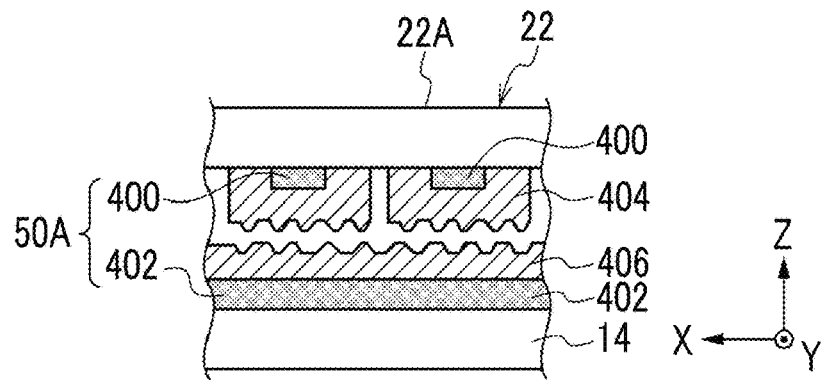
FIG. 19A is a schematic sectional view in an X-direction of a touch panel including a first capacitor that is a modification example of a first capacitor according to the first and second embodiments, and a first resistor and a second resistor that are examples of resistors according to the technique of the present disclosure.
Figure 19B:
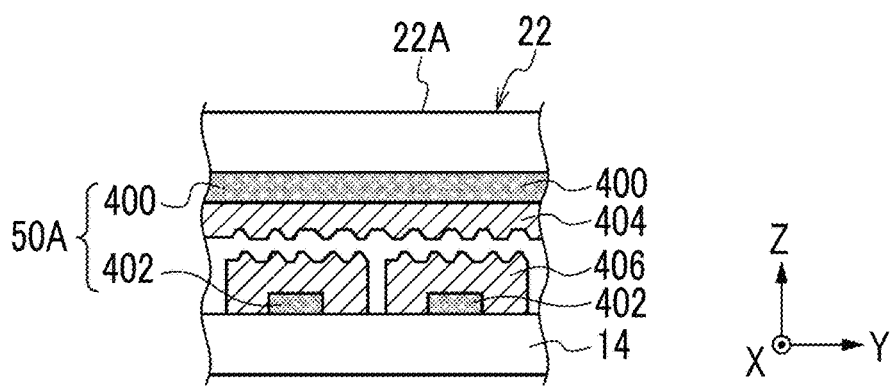
FIG. 19B is a schematic sectional view in a Y-direction of the touch panel including the first capacitor that is the modification example of the first capacitor according to the first and second embodiments, and the first resistor and the second resistor that are examples of the resistors according to the technique of the present disclosure.

In the above-described respective embodiments, a case where one set of the first capacitor 50 and the carbon sheet 52 formed by the first comb electrode 54 and the second comb electrode 56 is disposed for each set of coordinates is shown as an example, but the technique of the present disclosure is not limited thereto. For example, as shown in FIGS. 19A and 19B, a plurality of first conductive wires 400 may be applied instead of the plurality of first conductive wires 24 and the plurality of first comb electrodes 54, and a plurality of second conductive wires 402 may be applied instead of the plurality of second conductive wires 26 and the plurality of second comb electrodes 56. Further, in this case, instead of the carbon sheet 52, a first resistor 404 and a second resistor 406 are applied.

In the example shown in FIGS. 19A and 19B, a first capacitor 50A is employed instead of the first capacitor 50, and the first capacitor 50A is formed for each set of coordinates. The first capacitor 50A is formed by disposing the first conductive wire 400 and the second conductive wire 402 to face each other in the Z-direction.

The first conductive wires 400 are stretched in the Y-direction, and are disposed at a predetermined interval along the X-direction. On the other hand, the second conductive wires 402 are stretched in the X-direction, and are disposed at a predetermined interval along the Y-direction.

The first conductive wire 400 is coated with the first resistor 404, and the second conductive wire 402 is coated with the second resistor 406. The respective first resistors 404 related to the adjacent first conductive wires 400 are not in contact with each other. Further, the respective second resistors 406 related to the adjacent second conductive wires 402 are not in contact with each other.

In a case where the indicator I is in a contact state with respect to the instruction reception surface 22A, and in a case where the indicator I is in a non-contact state with respect to the instruction reception surface 22A, the first resistor 404 is not in contact with the second resistor 406. However, for example, as shown in FIG. 20, in a case where the indicator I is in an in-pressing state with respect to the instruction reception surface 22A, the first resistor 404 is in contact with the second resistor 406, and thus, a resistance value between the first conductive wire 400 and the second conductive wire 402 is changed.

Figure 20:
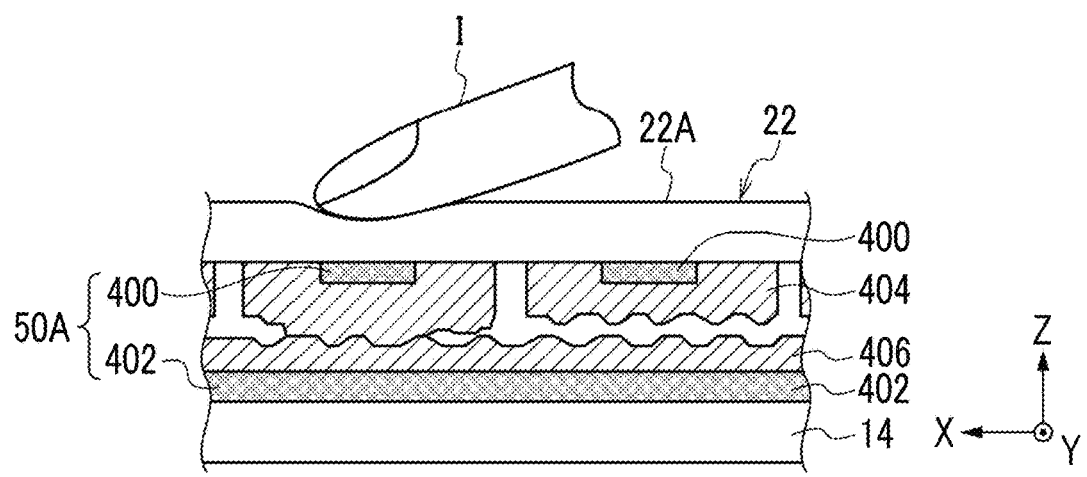
FIG. 20 is a schematic sectional view in the X-direction of the touch panel in a state where an instruction reception surface is pressed with an indicator, in the touch panel including the first capacitor that is the modification example of the first capacitor according to the first and second embodiments, and the first resistor and the second resistor that are examples of the resistors according to the technique of the present disclosure.

In the examples shown in FIGS. 19A and 19B, and FIG. 20, the first conductive wire 400 and the second conductive wire 402 correspond to an example of a pair of electrodes according to the technique of the present disclosure, and the first resistor 404 and the second resistor 406 correspond to an example of resistors according to the technique of the present disclosure.

Figure 21A:
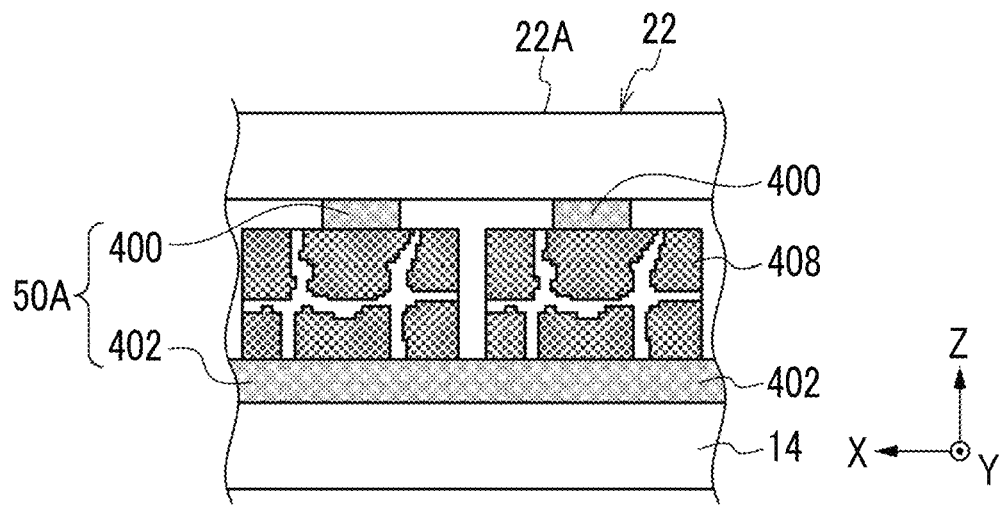
FIG. 21A is a schematic sectional view in the X-direction of the touch panel including the first capacitor that is the modification example of the first capacitor according to the first and second embodiments, and a variable resistor that is an example of a resistor according to the technique of the present disclosure.
Figure 21B:
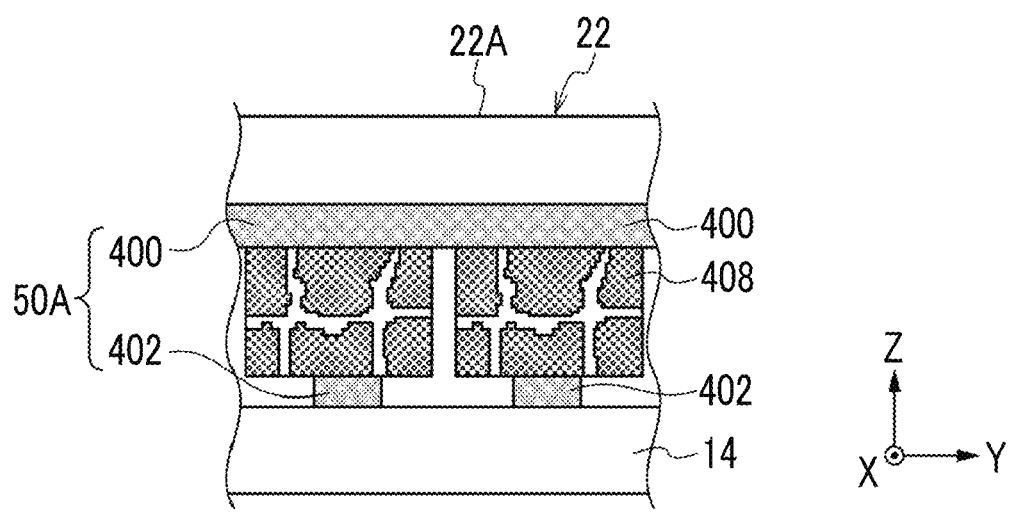
FIG. 21B is a schematic sectional view in the Y-direction of the touch panel including the first capacitor that is the modification example of the first capacitor according to the first and second embodiments, and the variable resistor that is an example of the resistor according to the technique of the present disclosure.

Further, as shown in the examples shown in FIGS. 19A and 19B, and FIG. 20, the first resistor 404 and the second resistor 406 are shown, but the technique of the present disclosure is not limited thereto. For example, as shown in FIGS. 21A and 21B, variable resistors 408 may be applied instead of the first resistor 404 and the second resistor 406. The variable resistor 408 is formed of variable resistance rubber in which conductive particles are scattered, and is formed in a cube shape. In a case where the variable resistor 408 maintains a state where the conductive particles are scattered in a case where a load is not applied, but in a case where a load is applied, the conductive particles are in contact with each other, and thus, a resistance value becomes small compared with a case where the load is not applied.

The variable resistor 408 is disposed as an intersection portion between the first conductive wire 400 and the second conductive wire 402. Accordingly, in a case where the indicator I is in a pressing state with respect to the instruction reception surface 22A, since the variable resistor 408 corresponding to a pressed position is flattened, the conductive particles are in contact with each other, so that the resistance value of the variable resistor 408 becomes smaller.

In addition, in the above-described respective embodiments, a case where the measurement process and the discrimination process are executed by the control circuit 70 has been described, but the technique of the present disclosure is not limited thereto. For example, as shown in FIG. 21, the measurement process and the discrimination process may be executed using a computer 450 and an I/O 460, instead of the control circuit 70.

Figure 22:
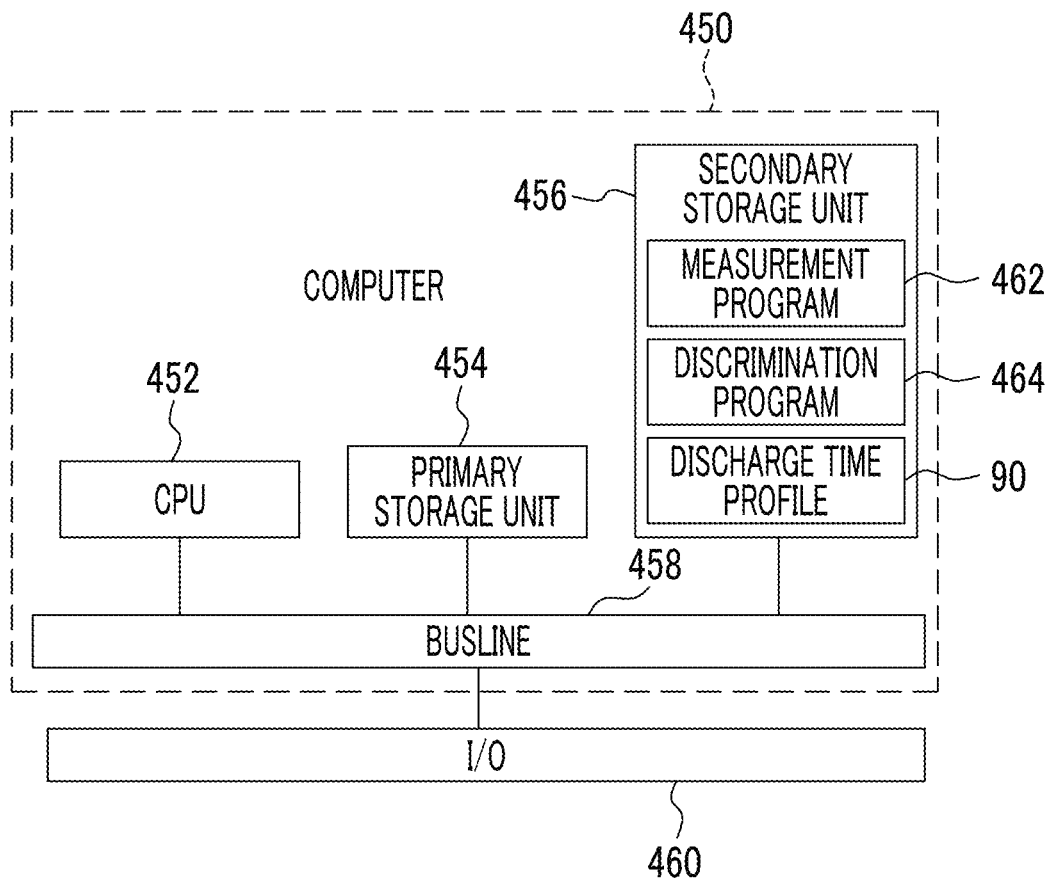
FIG. 22 is a block diagram showing an example of a computer and an I/O used instead of the control circuit according to the first and second embodiments.

For example, as shown in FIG. 22, the computer 450 includes a CPU 452, a primary storage unit 454, and a secondary storage unit 456. The CPU 452, the primary storage unit 454, and the secondary storage unit 456 are connected to a busline 458. The I/O 460 is connected to the busline 458. An input terminal of a first output buffer 72, an input terminal of a second output buffer 74, an output terminal of a comparator 76, a gate of an NMOS transistor N1, and a gate of an NMOS transistor N2 are connected to the I/O 460.

The secondary storage unit 456 stores a measurement program 462, a discrimination program 464, and the discharge time profile 90. The measurement program 462 and the discrimination program 464 are examples of programs according to the technique of the present disclosure.

The CPU 452 reads out the measurement program 462 and the discrimination program 464 from the secondary storage unit 456, and develops them into the primary storage unit 454. Further, the CPU 452 executes the measurement program 462 and the discrimination program 464 that are developed in the primary storage unit 454 to operate as a measurement unit and an output unit according to the technique of the present disclosure, so that the measurement process and the discrimination process described in the above-described respective embodiments are realized.

Figure 23:
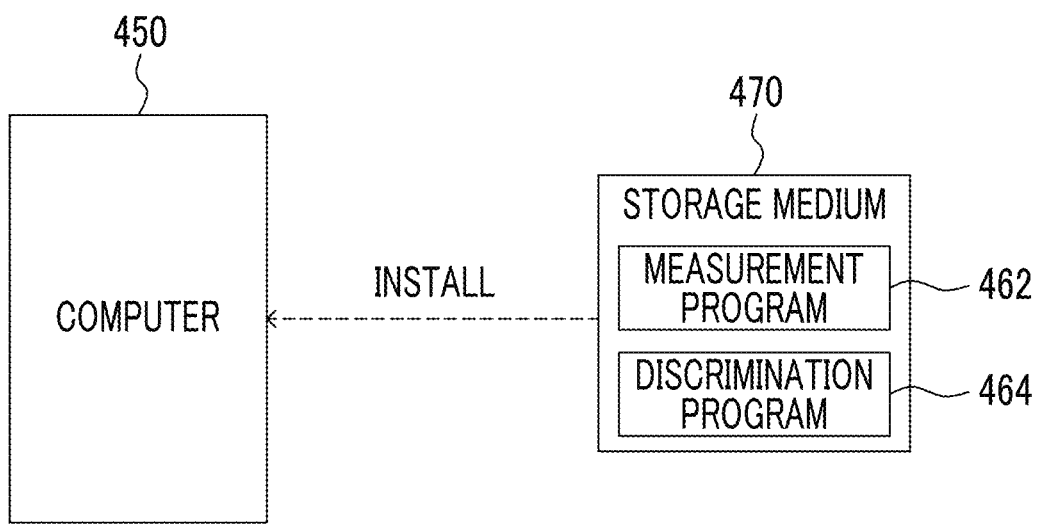
FIG. 23 is a schematic view showing an example of a form in which a measurement program and a discrimination program are installed from a storage medium into the computer used instead of the control circuit according to the first and second embodiments.

Further, in the example shown in FIG. 22, a case where the measurement program 462 and the discrimination program 464 are read out from the secondary storage unit 456 has been described, but it is not essential that the measurement program 462 and the discrimination program 464 are stored in the secondary storage unit 456 from the beginning. For example, as shown in FIG. 23, the measurement program 462 and the discrimination program 464 may be stored in a predetermined portable storage medium 470 such as a solid state drive (SSD) or a universal serial bus (USB) memory. In this case, the measurement program 462 and the discrimination program 464 stored in the storage medium 470 may be installed in the computer 450, and the installed measurement program 462 and discrimination program 464 may be executed by the CPU 452.

Figure 24:
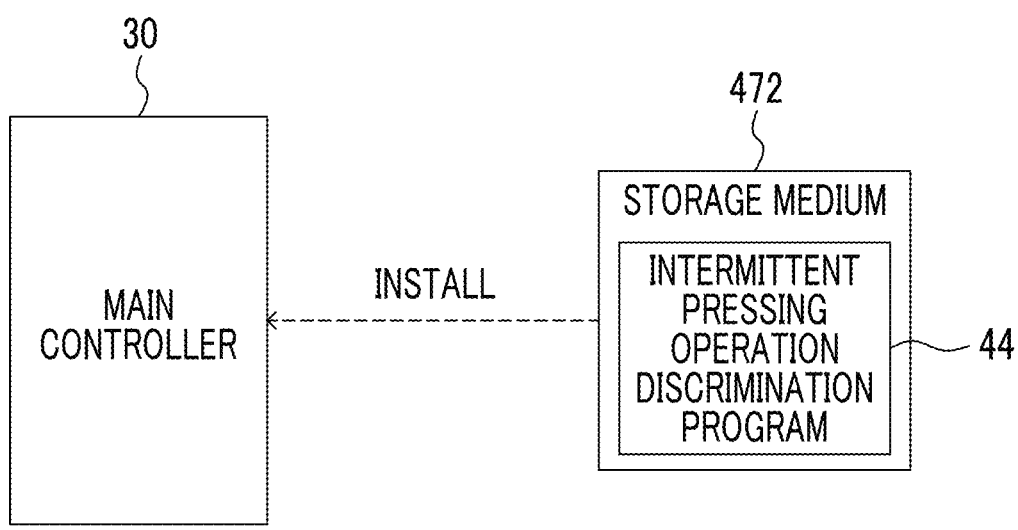
FIG. 24 is a schematic view showing an example of a form in which an intermittent pressing operation discrimination program is installed from a storage medium into the main controller according to the first and second embodiments.

In addition, in the above-described respective embodiments, an example in which the intermittent pressing operation discrimination program 44 is read out from the secondary storage unit 36 has been described, but it is not essential that the intermittent pressing operation discrimination program 44 is stored in the secondary storage unit 36 from the beginning. For example, as shown in FIG. 24, the intermittent pressing operation discrimination program 44 may be first stored in a storage medium 472. In this case, the intermittent pressing operation discrimination program 44 stored in the storage medium 472 may be installed in the main controller 30, and the installed intermittent pressing operation discrimination program 44 may be executed by the CPU 32.

Further, the above-described various programs may be stored in a storage unit such as another computer or a server apparatus connected to the smart device 10 through a communication network (not shown), and the programs may be downloaded according to a request of the smart device 10.

Further, the measurement process, the discrimination process, and the intermittent pressing operation discrimination process described in the above-described respective embodiments are merely examples. Accordingly, it is needless to say that an unnecessary step may be removed, a new step may be added, or a processing procedure may be changed within a range without departing from the concept of the invention.

The measurement process and the discrimination process may be realized only by a hardware configuration such as a field-programmable gate array (FPGA), or may be realized by a combination of a software configuration and a hardware configuration using a computer. In addition, the intermittent pressing operation discrimination process may be realized only by a hardware configuration such as an FPGA or an application specific integrated circuit (ASIC). Furthermore, the intermittent pressing operation discrimination process may be realized by a combination of a software configuration and a hardware configuration using a computer.

In the above-described respective embodiments, a case where a discharge time in the second capacitor 62 is measured by the control circuit 70 has been described, but the technique of the present disclosure is not limited thereto, and instead, a configuration in which a voltage of the second capacitor 62 is measured by the control circuit 70 may be used.

Figure 25:
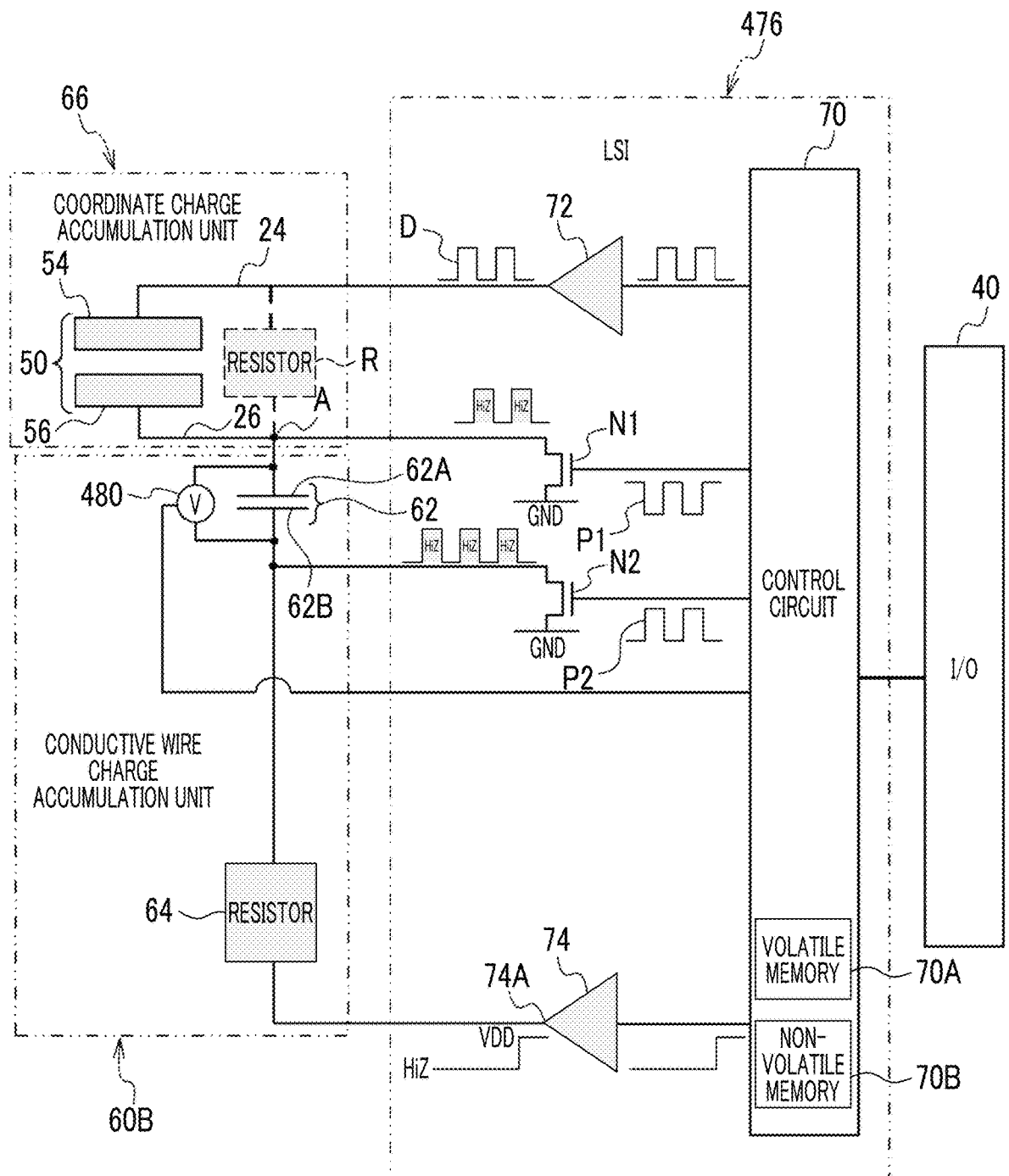
FIG. 25 is a schematic configuration diagram showing a first modification example of configurations of main units (coordinate charge accumulation unit, conductive wire charge accumulation unit, and LSI) of the touch panel included in the smart device according to the first and second embodiments.

In this case, for example, as shown in FIG. 25, instead of the LSI 48 shown in FIG. 6, an LSI 476 may be applied, and a conductive wire charge accumulation unit 60B may be applied, instead of the conductive wire charge accumulation unit 60A shown in FIG. 6.

The LSI 476 is different from the LSI 48 in that the comparator 76 is not provided. Further, the conductive wire charge accumulation unit 60B is different from the conductive wire charge accumulation unit 60A in that a voltmeter 480 is provided.

One end of the voltmeter 480 is connected to the first electrode 62A of the second capacitor 62, and the other end of the voltmeter 480 is connected to the second electrode 62B of the second capacitor 62. Further, the voltmeter 480 is connected to the control circuit 70, and measures a voltage of the second capacitor 62 and outputs the measurement result to the control circuit 70. In the non-volatile memory 70B of the control circuit 70, in-contact voltage information, in-pressing voltage information, and in-non-contact voltage information are stored. The in-contact voltage information refers to information indicating an absolute value of a predetermined in-contact voltage that is an absolute value of the voltage of the second capacitor 62 in a contact state. The in-pressing voltage information refers to information indicating an absolute value of a predetermined in-pressing voltage that is an absolute value of the voltage of the second capacitor 62 in an in-pressing state. The in-non-contact voltage information refers to information indicating an absolute value of a predetermined in-non-contact voltage that is an absolute value of the voltage of the second capacitor 62 in a non-contact state.

Instead of comparing a discharge time with an in-contact discharge time, the control circuit 70 compares an absolute value (an example of a physical quantity according to the technique of the present disclosure) of a voltage measured by the voltmeter 480 with an absolute value (an example of a predetermined in-contact physical quantity according to the technique of the present disclosure) of a voltage indicated by in-contact voltage information. Further, instead of comparing a discharge time with an in-pressing discharge time, the control circuit 70 compares the absolute value of the voltage measured by the voltmeter 480 with an absolute value (an example of a predetermined in-pressing physical quantity according to the technique of the present disclosure) of a voltage indicated by in-pressing voltage information. Furthermore, instead of comparing a discharge time with an in-non-contact discharge time, the control circuit 70 compares the absolute value of the voltage measured by the voltmeter 480 with an absolute value (an example of a predetermined in-non-contact physical quantity according to the technique of the present disclosure) of a voltage indicated by in-non-contact voltage information.

Figure 26:
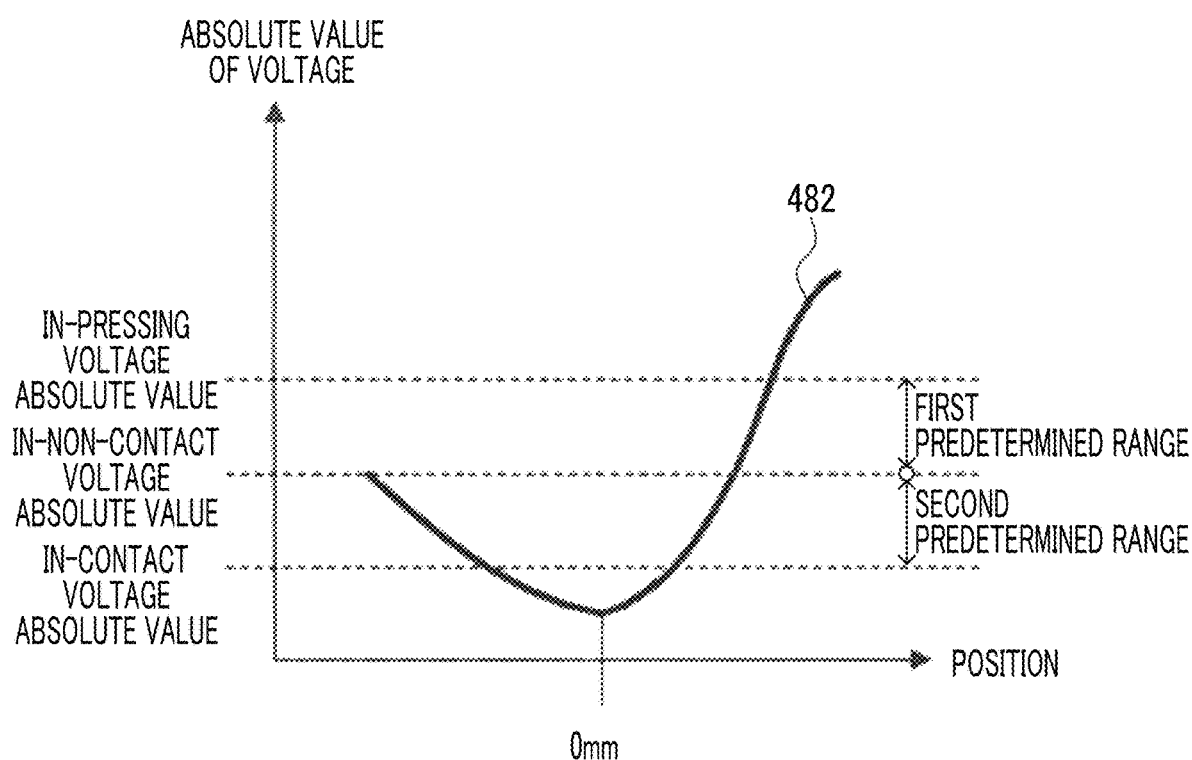
FIG. 26 shows an example of a voltage profile used by the control circuit in a case where a discrimination process is executed by the control circuit using the configuration shown in FIG. 25.

Further, in a case where a voltage value of the second capacitor 62 is measured, for example, as shown in FIG. 26, the voltage profile 482 may be applied instead of the discharge time profile 90, and the voltage profile 482 may be compared with an absolute value of the voltage measured by the voltmeter 480.

For example, as shown in FIG. 26, the voltage profile 482 is different from the discharge time profile 90 in that an in-pressing voltage absolute value is provided instead of an in-pressing discharge time. The in-pressing voltage absolute value refers to an absolute value of a voltage indicated by in-pressing voltage information. Further, the voltage profile 482 is different from the discharge time profile 90 in that an in-non-contact voltage absolute value is provided instead of an in-non-contact discharge time. The in-non-contact voltage absolute value refers to an absolute value of a voltage indicated by in-non-contact voltage information. Furthermore, the voltage profile 482 is different from the discharge time profile 90 in that an in-contact voltage absolute value is provided instead of an in-contact discharge time. The in-contact voltage absolute value refers to an absolute value of a voltage indicated by in-contact voltage information.

In this way, since the voltage of the second capacitor 62 is measured by the voltmeter 480 and the measured voltage is compared with the voltage profile 482, by the control circuit 70, the same effects as in the respective embodiments may be obtained. Further, according to the touch panel 42 to which the LSI 476 and the conductive wire charge accumulation unit 60B shown in FIG. 25 are applied, it is possible to promptly discriminate between a contact state, a non-contact state, and an in-pressing state with respect to the instruction reception surface 22A of the indicator I, compared with a case where both of an electrostatic capacitance and a resistance value are measured.

Further, in the example shown in FIG. 25, a state signal is output in accordance with a comparison result of a voltage measured by the voltmeter 480 and the voltage profile 482, but the technique of the present disclosure is not limited thereto. For example, the state signal may be output in accordance with a logical product of a comparison result based on an output result of the comparator 76 and a comparison result based on a measurement result of the voltmeter 480.

Figure 27:
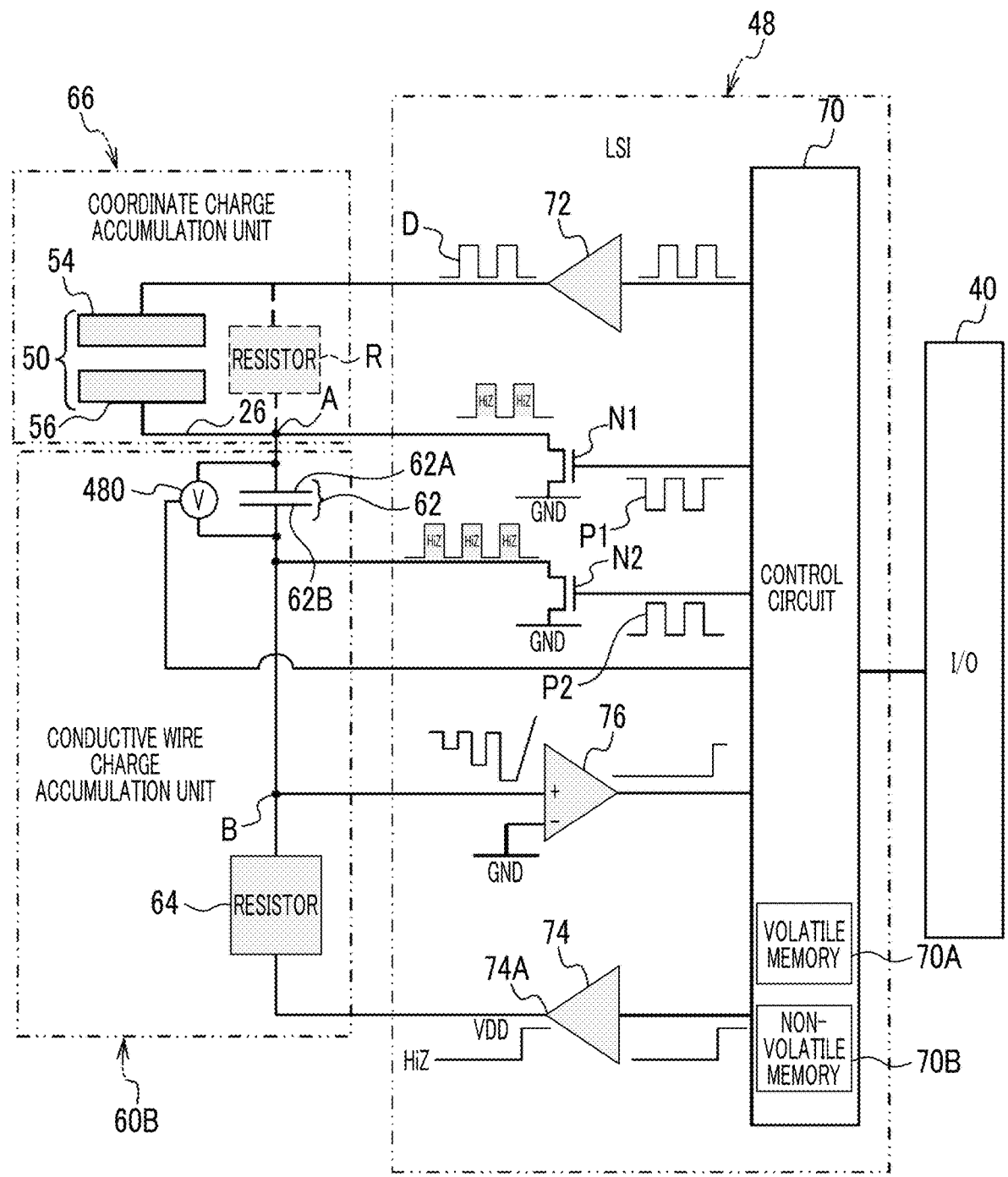
FIG. 27 is a schematic configuration diagram showing a second modification example of configurations of main units (coordinate charge accumulation unit, conductive wire charge accumulation unit, and LSI) of the touch panel included in the smart device according to the first and second embodiments.

In this case, for example, as shown in FIG. 27, both of the comparator 76 and the voltmeter 480 are connected to the control circuit 70, and the control circuit 70 calculates the logical product of the comparison result based on the output result of the comparator 76 and the comparison result based on the measurement result of the voltmeter 480. Further, the control circuit 70 does not output a state signal in a case where the logical product is "0", for example, and outputs a state signal in a case where the logical product is "1".

Figure 28:
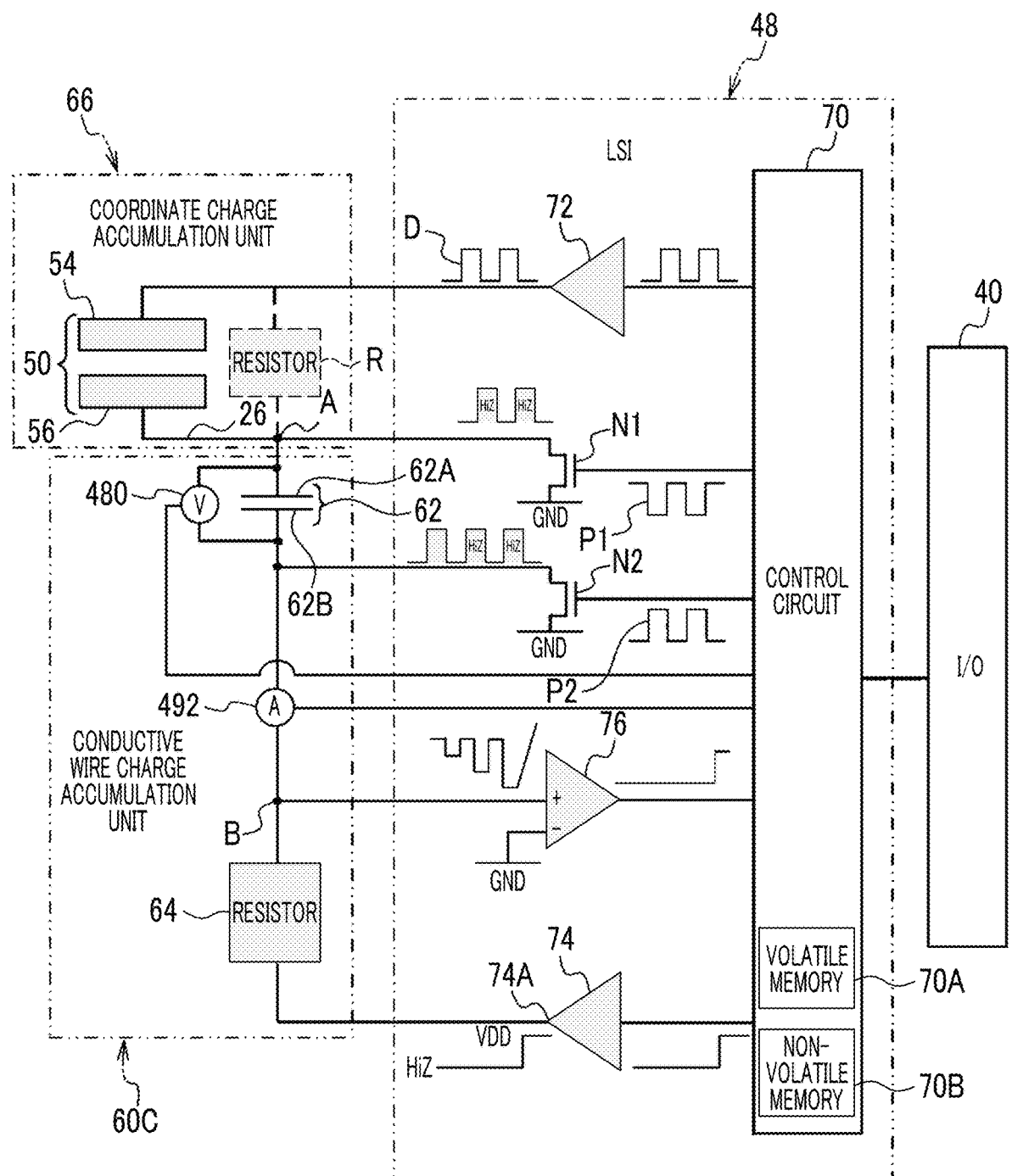
FIG. 28 is a schematic configuration diagram showing a third modification example of configurations of main units (coordinate charge accumulation unit, conductive wire charge accumulation unit, and LSI) of the touch panel included in the smart device according to the first and second embodiments.

Further, for example, as shown in FIG. 28, instead of the conductive wire charge accumulation unit 60B shown in FIG. 25, a conductive wire charge accumulation unit 60C may be applied. The conductive wire charge accumulation unit 60C is different from the conductive wire charge accumulation unit 60B in that an ammeter 492 is provided.

The ammeter 492 is connected to the control circuit 70. In this case, in the non-volatile memory 70B of the control circuit 70, in-contact electric current information corresponding to in-contact voltage information, in-pressing electric current information corresponding to in-pressing voltage information, and in-non-contact electric current information corresponding to in-non-contact voltage information are stored. The in-contact electric current information refers to information indicating an absolute value of a predetermined in-contact electric current that is an absolute value of an electric current flowing between the second electrode 62B and the point B in a contact state. The in-pressing electric current information refers to information indicating an absolute value of a predetermined in-pressing electric current that is an absolute value of an electric current flowing between the second electrode 62B and the point B in an in-pressing state. The in-non-contact electric current information refers to information indicating an absolute value of a predetermined in-pressing electric current that is an absolute value of an electric current flowing between the second electrode 62B and the point B in a non-contact state. Further, in the non-volatile memory 70B of the control circuit 70, an electric current profile (not shown) corresponding to the voltage profile 482 is also stored.

The control circuit 70 outputs a state signal in accordance with a logical product of a comparison result based on an output result of the comparator 76, a comparison result based on a measurement result of the voltmeter 480, and a comparison result based on a measurement result of the ammeter 492. That is, the control circuit 70 calculates the logical product of the comparison result based on the output result of the comparator 76, the comparison result based on the measurement result of the voltmeter 480, and the comparison result based on the measurement result of the ammeter 492. Further, the control circuit 70 does not output a state signal in a case where the logical product is "0", and outputs a state signal in a case where the logical product is "1".

In the example shown in FIG. 28, a case where the voltmeter 480, the ammeter 492, and the comparator 76 are used together is shown, but the technique of the present disclosure is not limited thereto. For example, the technique of the present disclosure includes a configuration in which the voltmeter 480 among the voltmeter 480, the ammeter 492, and the comparator 76 is not used. Further, the technique of the present disclosure also includes a configuration in which the voltmeter 480 and the comparator 76 among the voltmeter 480, the ammeter 492, and the comparator 76 are not used.

Further, in the above-described respective embodiments, a case where the coordinate charge accumulation unit 66 is provided for each set of all coordinates has been described, but the technique of the present disclosure is not limited thereto, and the coordinate charge accumulation unit 66 may be provided with respect to only one set of coordinates. For example, the coordinate charge accumulation unit 66 may be provided with respect to only coordinates that is set in advance as one set of coordinates where an intermittent pressing operation is performed, in the touch panel 42.

The entirety of disclosure of JP2015-205807 filed on Oct. 19, 2015 is incorporated in this specification by reference.

All documents, patent applications, and technical standards written in this specification are incorporated in this specification by reference to the same degree that each of the documents, patent applications, and technical standards is specifically and individually incorporated by reference.

What is claimed is:

1. An instruction reception apparatus comprising:
   an instruction reception surface that receives an instruction;
   a charge accumulation unit that includes a first capacitor in which a pair of electrodes are disposed to face each other under the instruction reception surface, a resistor that is disposed to correspond to the pair of electrodes under the instruction reception surface and has a resistance value between the pair of electrodes that is changed as the instruction reception surface is pressed, and a second capacitor that is connected to the first capacitor;
   a measurement unit that measures a physical quantity corresponding to the amount of electric charges of the second capacitor; and
   an output unit that selectively outputs a contact state signal indicating a contact state where an indicator is in contact with the instruction reception surface, a non-contact state signal indicating a non-contact state where the indicator is not in contact with the instruction reception surface, and a pressing state signal indicating a pressing state where the indicator presses against the instruction reception surface, in accordance with the physical quantity measured by the measurement unit, wherein:

the output unit outputs the contact state signal in a case where an in-contact physical quantity that is set in advance as a physical quantity corresponding to the amount of electric charges in the contact state is measured by the measurement unit, outputs the non-contact state signal in a case where an in-non-contact physical quantity that is set in advance as a physical quantity corresponding to the amount of electric charges in the non-contact state is measured by the measurement unit, and outputs the pressing state signal in a case where an in-pressing physical quantity that is set in advance as a physical quantity corresponding to the amount of electric charges in the pressing state is measured by the measurement unit;

the in-non-contact physical quantity is larger than the in-contact physical quantity, and the in-pressing physical quantity is larger than the in-non-contact physical quantity;

in a case where the physical quantity that exceeds the in-contact physical quantity and is smaller than the in-pressing physical quantity is measured by the measurement unit, the output unit selectively outputs the contact state signal and the non-contact state signal in accordance with a change in the physical quantity measured by the measurement unit, and wherein:

the physical quantity is a discharge time of the second capacitor.

2. The instruction reception apparatus according to claim 1, wherein in a case where the in-non-contact physical quantity is measured by the measurement unit and the change in the physical quantity measured by the measurement unit represents a predetermined change, the output unit outputs the non-contact state signal.

3. The instruction reception apparatus according to claim 1, wherein in a case where the contact state signal is previously output, and the physical quantity that is different from the in-non-contact physical quantity, exceeds the in-contact physical quantity, and is smaller than the in-pressing physical quantity is measured by the measurement unit, the output unit outputs the contact state signal.

4. The instruction reception apparatus according to claim 1, wherein:

the first capacitor is formed for each set of coordinates provided to the instruction reception surface; and the output unit outputs the contact state signal in a case where the contact state signal is not previously output with respect to focused coordinates among the coordinates, in a case where the physical quantity that exceeds the in-non-contact physical quantity and is smaller than the in-pressing physical quantity is measured with respect to the focused coordinates by the measurement unit, and in a case where the physical quantity that exceeds the in-contact physical quantity and is smaller than the in-non-contact physical quantity or the physical quantity that exceeds the in-non-contact physical quantity and is smaller than the in-pressing physical quantity is measured with respect to coordinates adjacent to the focused coordinates by the measurement unit.

5. The instruction reception apparatus according to claim 1, wherein: the first capacitor is formed for each set of coordinates provided to the instruction reception surface; and the output unit outputs the non-contact state signal in a case where the physical quantity that exceeds the in-contact physical quantity and is equal to or smaller than the in-non-contact physical quantity is measured with respect to the focused coordinates among the coordinates by the measurement unit, and in a case where the in-non-contact physical quantity is measured with respect to coordinates adjacent to the focused coordinates by the measurement unit.

6. The instruction reception apparatus according to claim 1, wherein:

the pair of electrodes are a pair of comb electrodes each having a comb portion;

the first capacitor is a capacitor formed so that the comb portions of both of the pair of comb electrodes are alternately disposed; and the resistor is disposed at a position where a resistance value between the comb portions of both of the pair of comb electrodes is changeable as the instruction reception surface is pressed.

7. The instruction reception apparatus according to claim 1, wherein the first capacitor is formed for each set of coordinates provided to the instruction reception surface.

8. An information processing apparatus comprising:

the instruction reception apparatus according to claim 1; and an execution unit that executes processes respectively corresponding to the contact state signal, the non-contact state signal, and the in-pressing state signal output from the output unit included in the instruction reception apparatus.

9. The information processing apparatus according to claim 8, wherein the execution unit executes a process corresponding to an intermittent pressing operation of repeating the contact state and the pressing state in a case where the non-contact state signal is not output and the pressing state signal is output before and after the contact state signal is output from the output unit within a predetermined time.

10. A signal processing method comprising:

measuring a physical quantity corresponding to the amount of electric charges of a second capacitor included in an instruction reception apparatus including an instruction reception surface that receives an instruction, and a charge accumulation unit that includes a first capacitor in which a pair of electrodes are disposed to face each other under the instruction reception surface, a resistor that is disposed to correspond to the pair of electrodes under the instruction reception surface and has a resistance value between the pair of electrodes that is changed as the instruction reception surface is pressed, and the second capacitor that is connected to the first capacitor, outputting the contact state signal in a case where an in-contact physical quantity that is set in advance as a physical quantity corresponding to the amount of electric charges indicating a contact state where an indicator is in contact with the instruction reception surface is measured, outputting the non-contact state signal in a case where an in-non-contact physical quantity that is set in advance as a physical quantity corresponding to the amount of electric charges indicating a non-contact state where the indicator is in contact with the instruction reception surface is measured, outputting the pressing state signal in a case where an in-pressing physical quantity that is set in advance as a physical quantity corresponding to the amount of electric charges indicating a pressing state where the indicator presses against the instruction reception surface is measured, the in-non-contact physical quantity being larger than the in-contact physical quantity, and the in-pressing physical quantity being larger than the in-non-contact physical quantity, and in a case where the physical quantity that exceeds the in-contact physical quantity and is smaller than the in-pressing physical quantity is measured, selectively outputting the contact state signal and the non-contact state signal in accordance with a change in the physical quantity measured, wherein:

the physical quantity is a discharge time of the second capacitor.

11. A non-transitory computer-readable storage medium storing a program for causing a computer to execute processes comprising:

measuring a physical quantity corresponding to the amount of electric charges of a second capacitor included in an instruction reception apparatus including an instruction reception surface that receives an instruction, and a charge accumulation unit that includes a first capacitor in which a pair of electrodes are disposed to face each other under the instruction reception surface, a resistor that is disposed to correspond to the pair of electrodes under the instruction reception surface and has a resistance value between the pair of electrodes that is changed as the instruction reception surface is pressed, and the second capacitor that is connected to the first capacitor, outputting the contact state signal in a case where an in-contact physical quantity that is set in advance as a physical quantity corresponding to the amount of electric charges indicating a contact state where an indicator is in contact with the instruction reception surface is measured, outputting the non-contact state signal in a case where an in-non-contact physical quantity that is set in advance as a physical quantity corresponding to the amount of electric charges indicating a non-contact state where the indicator is in contact with the instruction reception surface is measured, outputting the pressing state signal in a case where an in-pressing physical quantity that is set in advance as a physical quantity corresponding to the amount of electric charges indicating a pressing state where the indicator presses against the instruction reception surface is measured, the in-non-contact physical quantity being larger than the in-contact physical quantity, and the in-pressing physical quantity being larger than the in-non-contact physical quantity, and in a case where the physical quantity that exceeds the in-contact physical quantity and is smaller than the in-pressing physical quantity is measured, selectively outputting the contact state signal and the non-contact state signal in accordance with a change in the physical quantity measured, wherein:

the physical quantity is a discharge time of the second capacitor.

\* \* \* \* \*